(12) United States Patent
Esser et al.

(10) Patent No.: US 10,521,714 B2
(45) Date of Patent: Dec. 31, 2019

(54) MULTI-COMPARTMENT NEURONS WITH NEURAL CORES

(71) Applicant: International Business Machines Corporation, Armonk, NY (US)

(72) Inventors: Steven K. Esser, San Jose, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 15/003,703

(22) Filed: Jan. 21, 2016

(65) Prior Publication Data

US 2016/0155047 A1 Jun. 2, 2016

Related U.S. Application Data

(63) Continuation of application No. 13/596,278, filed on Aug. 28, 2012, now Pat. No. 9,275,330, which is a
(Continued)

(51) Int. Cl.
*G06N 3/04* (2006.01)
*G06N 3/063* (2006.01)
(Continued)

(52) U.S. Cl.
CPC ............ *G06N 3/04* (2013.01); *G06F 9/44505* (2013.01); *G06N 3/049* (2013.01); *G06N 3/063* (2013.01); *G06N 3/088* (2013.01)

(58) Field of Classification Search
CPC .................................................. G06N 3/082
See application file for complete search history.

(56) References Cited

U.S. PATENT DOCUMENTS

| 5,148,514 A | 9/1992 | Arima et al. |
| 6,763,340 B1 | 7/2004 | Burns et al. |

(Continued)

OTHER PUBLICATIONS

Kumazawa, I. et al., "A Learning Scheme for Bipartite Recurrent Networks and Its Performance", Proceedings of the 1993 First New Zealand International Two-Stream Conference on Artificial Neural Networks and Expert Systems, Nov. 26, 1993, pp. 34-37, IEEE, United States.

(Continued)

*Primary Examiner* — Stanley K. Hill
(74) *Attorney, Agent, or Firm* — Sherman IP LLP; Kenneth L. Sherman; Hemavathy Perumal

(57) ABSTRACT

Embodiments of the invention provide a neural core circuit comprising a synaptic interconnect network including plural electronic synapses for interconnecting one or more source electronic neurons with one or more target electronic neurons. The interconnect network further includes multiple axon paths and multiple dendrite paths. Each synapse is at a cross-point junction of the interconnect network between a dendrite path and an axon path. The core circuit further comprises a routing module maintaining routing information. The routing module routes output from a source electronic neuron to one or more selected axon paths. Each synapse provides a configurable level of signal conduction from an axon path of a source electronic neuron to a dendrite path of a target electronic neuron.

16 Claims, 35 Drawing Sheets

Related U.S. Application Data continuation of application No. 13/434,733, filed on Mar. 29, 2012, now Pat. No. 8,868,477.

(51) Int. Cl.
*G06F 9/445* (2018.01)
*G06N 3/08* (2006.01)

(56) References Cited

U.S. PATENT DOCUMENTS

| | | | |
|---|---|---|---|
| 7,174,325 | B1 | 2/2007 | Ascoli |
| 7,398,259 | B2 | 7/2008 | Nugent |
| 7,502,769 | B2 | 3/2009 | Nugent |
| 7,533,071 | B2 | 5/2009 | Snook et al. |
| 7,818,273 | B2 | 10/2010 | Ananthanarayanan et al. |
| 8,250,011 | B2 | 8/2012 | Van Der Made |
| 8,311,965 | B2 | 11/2012 | Breitwisch et al. |
| 9,015,091 | B2 * | 4/2015 | Hunzinger ............ G06N 3/082 706/25 |
| 2010/0235310 | A1 | 9/2010 | Gage et al. |
| 2010/0241601 | A1 | 9/2010 | Carson et al. |
| 2011/0004579 | A1 | 1/2011 | Snider |
| 2013/0073497 | A1 * | 3/2013 | Akopyan ............... G06N 3/049 706/27 |
| 2014/0032465 | A1 | 1/2014 | Modha |
| 2015/0262057 | A1 | 9/2015 | Modha |
| 2017/0017875 | A1 | 1/2017 | Modha |

OTHER PUBLICATIONS

Long, B. et al., "Unsupervised Learning on K-partite Graphs", Proceedings of the 12th SIGKDD International Conference on Knowledge Discovery and Data Mining (KKD'06), Aug. 20-23, 2006, pp. 317-326, ACM, United States.

Silver, R. et al., "Neurotech for Neuroscience: Unifying Concepts, Organizing Principles, and Emerging Tools", The Journal of Neuroscience, Oct. 31, 2007, pp. 11807-11819, United States.

Lee, J.H. et al., "CMOL CrossNets: Possible Neuromorphic Nanoelectronic Circuits", Advances in Neural Information Processing Systems, 2006, pp. 755-762, vol. 18, MIT Press, United States.

U.S. Non-Final Office Action for U.S. Appl. No. 13/434,729 dated Jun. 18, 2014.

U.S. Notice of Allowance for U.S. Appl. No. 13/434,729 dated Oct. 21, 2014.

U.S. Non-Final Office Action for U.S. Appl. No. 13/594,069 dated Aug. 21, 2015.

U.S. Notice of Allowance for U.S. Appl. No. 13/594,069 dated Sep. 15, 2015.

U.S. Notice of Allowance for U.S. Appl. No. 13/434,733 dated Jun. 19, 2014.

U.S. Non-Final Office Action for U.S. Appl. No. 13/596,278 dated Sep. 8, 2015.

U.S. Notice of Allowance for U.S. Appl. No. 13/596,278 dated Nov. 3, 2015.

U.S. Non-Final Office Action for U.S. Appl. No. 14/491,816 dated Apr. 23, 2015.

U.S. Notice of Allowance for U.S. Appl. No. 14/491,816 dated May 28, 2015.

Jin, X. et al. "Efficient Modelling of Spiking Neural networks on a Scalable Chip Multiprocessor", 2008 IEEE International Joint Conference on Neural Networks, Jun. 1, 2008, pp. 2812-2819, IEEE, United States.

Merolla, P.A. et al. "Expandable Networks for Neuromorphic Chips" 2007 IEEE Transactions on Circuits and Systems I: Regular Papers, Feb. 2007, vol. 54, No. 2, pp. 301-311, IEEE, United States.

Jin, X. et al., "Modeling Spiking Neural Networks on SpiNNaker", Computing in science & engineering, Sep. 2010, pp. 91-97, IEEE Novel Architectures, United States.

Rast, A.D. et al. "Scalable Event-Driven Native Parallel Processing: The SpiNNaker Neuromimetic System", Proceedings of the 7th ACM International Conference on Computing Frontiers, May 17, 2010, pp. 21-30, ACM, United States.

Bruderle, D. et al., "A comprehensive workflow for general-purpose neural modeling with highly configurable neuromorphic hardware systems" Biological Cybernetics, May 1, 2011, vol. 104, No. 4-5, pp. 263-296, Springer-Verlag, United States.

U.S. Non-Final Office Action for U.S. Appl. No. 14/945,284 dated Jan. 30, 2019.

U.S. Notice of Allowance for U.S. Appl. No. 14/945,284 dated Jun. 19, 2019.

U.S. Supplemental Notice of Allowability for U.S. Appl. No. 14/945,284 dated Sep. 12, 2019.

* cited by examiner

| Soma → Axon | Soma → Soma |
|---|---|
| Axon → Dendrite | Dendrite → Soma |

FIG. 16

| Soma → Axon | Redirection | Soma → Soma |
|---|---|---|
| Redirection | | Redirection |
| Axon → Dendrite | Redirection | Dendrite → Soma |

FIG. 17B

MULTI-COMPARTMENT NEURONS WITH NEURAL CORES

GOVERNMENT RIGHTS

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, representing a multi-compartment neuron using neural cores.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

SUMMARY

In one embodiment, a neural core circuit comprises a synaptic interconnect network including plural electronic synapses for interconnecting one or more source electronic neurons with one or more target electronic neurons. The interconnect network further includes multiple axon paths and multiple dendrite paths. Each synapse is at a cross-point junction of the interconnect network between a dendrite path and an axon path. The core circuit further comprises a routing module maintaining routing information. The routing module routes output from a source electronic neuron to one or more selected axon paths. Each synapse provides a configurable level of signal conduction from an axon path of a source electronic neuron to a dendrite path of a target electronic neuron.

In another embodiment, a method comprises interconnecting at least one source electronic neuron in a neural core circuit with at least one target electronic neuron in the neural core circuit via a synaptic interconnect network. The interconnect network comprises plural electronic synapses, multiple axon paths, and multiple dendrite paths, wherein each synapse is at a cross-point junction of the interconnect network between a dendrite path and an axon path. The method further comprises routing output from a source electronic neuron to one or more selected axon paths using a routing module maintaining routing information, and configuring each synapse to provide a desired level of signal conduction from an axon path of a source electronic neuron to a dendrite path of a target electronic neuron.

In yet another embodiment, a non-transitory computer-useable storage medium for producing spiking computation in a neural core circuit comprising a synaptic interconnect network including plural electronic synapses, multiple axon paths, and multiple dendrite paths is provided. Each synapse is at a cross-point junction of the interconnect network between a dendrite path and an axon path. The computer-useable storage medium has a computer-readable program. The program upon being processed on a computer causes the computer to implement the steps of interconnecting one or more source electronic neurons with one or more target electronic neurons via the interconnect network, routing output from a source electronic neuron to one or more selected axon paths using a routing module maintaining routing information, and configuring each synapse to provide a desired level of signal conduction from an axon path of a source electronic neuron to a dendrite path of a target electronic neuron.

These and other features, aspects and advantages of the present invention will become understood with reference to the following description, appended claims and accompanying figures.

BRIEF DESCRIPTION OF THE DRAWINGS

FIG. 16 illustrates multiple levels of structural plasticity that can be obtained using functional neural core circuits, in accordance with an embodiment of the invention;

FIG. 17B illustrates multiple levels of structural plasticity that can be obtained using functional neural core circuits and connectivity neural core circuits, in accordance with an embodiment of the invention;

DETAILED DESCRIPTION

Figure 1A:
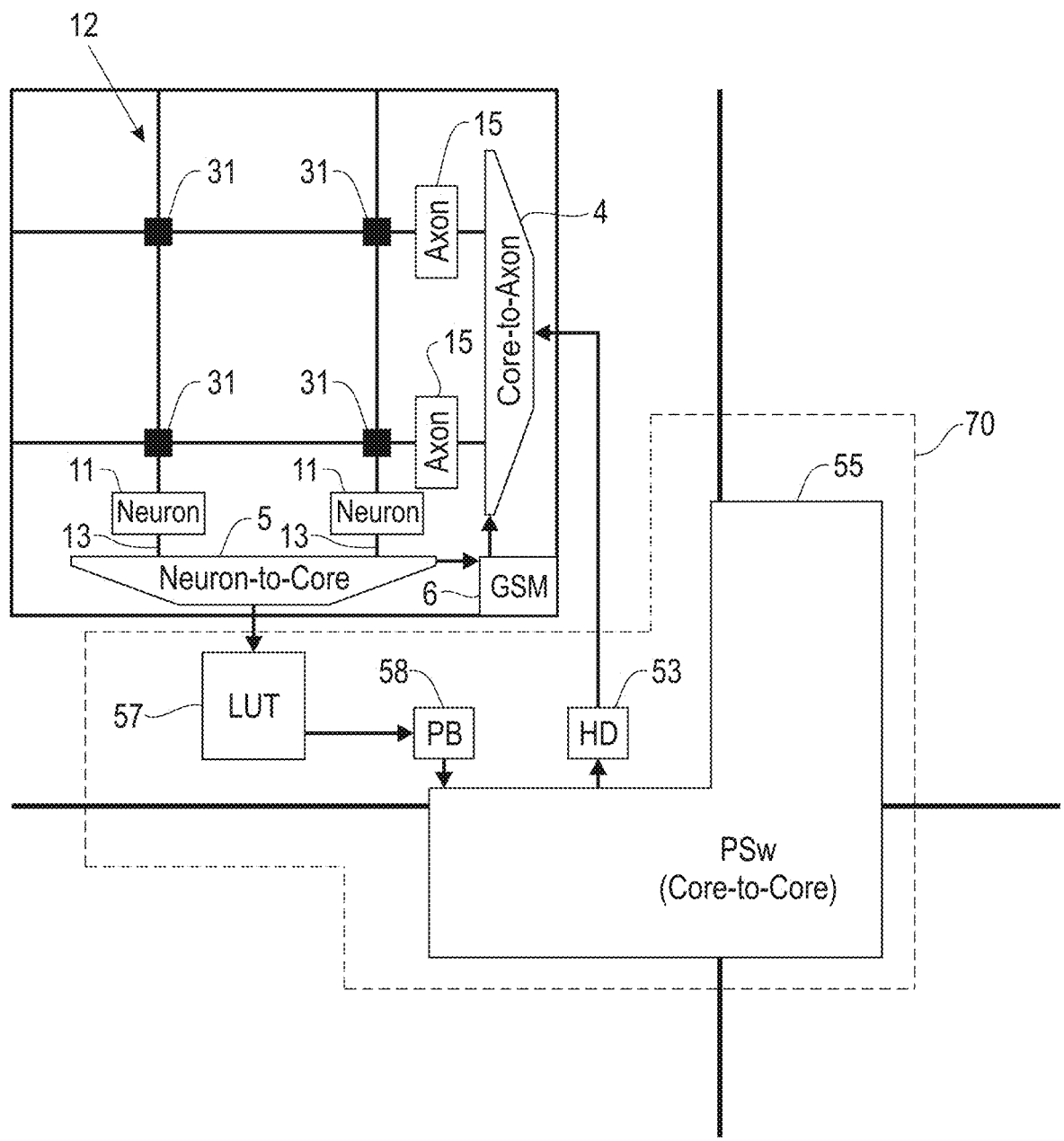
FIG. 1A illustrates a core module, in accordance with an embodiment of the invention.

Embodiments of the invention relate to neuromorphic and synaptronic computation, and in particular, representing a multi-compartment neuron using neural cores. Embodiments of the present invention provide a neural core circuit comprising a synaptic interconnect network including plural electronic synapses for interconnecting one or more source electronic neurons with one or more target electronic neurons. The interconnect network further includes multiple axon paths and multiple dendrite paths. Each synapse is at a cross-point junction of the interconnect network between a dendrite path and an axon path. The core circuit further comprises a routing module maintaining routing information. The routing module routes output from a source electronic neuron to one or more selected axon paths. Each synapse provides a configurable level of signal conduction from an axon path of a source electronic neuron to a dendrite path of a target electronic neuron.

Each synapse has configurable operational parameters. Each neuron has configurable operational parameters. For each source electronic neuron, the output of said source electronic neuron is a binary signal comprising of spikes and non-spikes. Each target electronic neuron receives input from one or more selected dendrite paths. For each target electronic neuron, the input received is a binary signal comprising of spikes and non-spikes.

A neural core circuit can be configured to represent different neural functions. In one embodiment, the neural core circuit represents a standard core. In a standard core, each source electronic neuron sends output to only one axon path. The axon path of each source electronic neuron includes synapses that are configured to provide any level of signal conduction from the axon path of said source electronic neuron to a dendrite path of a target electronic neuron.

In another embodiment, the neural core circuit represents a splitter core. Each source electronic neuron sends output to one or more axon paths. Each axon path of a source electronic neuron includes conducting synapses with a set of dendrite paths, wherein each dendrite path in the set of dendrite paths has a conducting synapse with only said axon path. Each synapse on an axon path is set to one of the following synaptic states: a fully conducting state, and a non-conducting state. Further, each target electronic neuron generates a spike each time said target electronic neuron receives a spike from a source electronic neuron via a conducting synapse.

In yet another embodiment, the neural core circuit represents a simulated multi-bit synapse core. Each source electronic neuron sends output to two or more axon paths. The connection strength from a source electronic neuron to a target electronic neuron is equal to the sum of the signal conduction level from the axon paths of the source electronic neuron to the dendrite paths of the target electronic neuron. Each synapse on each axon path of a source electronic neuron is set to one of the following synaptic states: a fully conducting state, and a non-conducting state.

In yet another embodiment, the neural core circuit represents a merger core. Each source electronic neuron is configured to send output to one or more axon paths. All axon paths of said source electronic neuron include conducting synapses with dendrite paths of only one target electronic neuron. Each synapse on each axon path of a source electronic neuron is set to one of the following synaptic states: a fully conducting state, and a non-conducting state.

In yet another embodiment, the neural core circuit represents a random core. Each source electronic neuron sends output to one or more axon paths. Each axon path of a source electronic neuron includes synapses that are configured to provide a random level of signal conduction from said axon path of said source electronic neuron to a dendrite path of a target electronic neuron.

The neural core circuit can be organized into a neural network including multiple neural core circuits. Each neural core circuit of the neural network represents a different neural function. Output from electronic neurons in a neural core circuit of the neural network is routed to axon paths in a different neural core circuit of the neural network.

In another embodiment, the present invention provides a method comprising interconnecting at least one source electronic neuron in a neural core circuit with at least one target electronic neuron in the neural core circuit via a synaptic interconnect network. The interconnect network comprises plural electronic synapses, multiple axon paths, and multiple dendrite paths, wherein each synapse is at a cross-point junction of the interconnect network between a dendrite path and an axon path. The method further comprises routing output from a source electronic neuron to one or more selected axon paths using a routing module maintaining routing information, and configuring each synapse to provide a desired level of signal conduction from an axon path of a source electronic neuron to a dendrite path of a target electronic neuron.

In yet another embodiment, the present invention provides a non-transitory computer-useable storage medium for producing spiking computation in a neural core circuit comprising a synaptic interconnect network including plural electronic synapses, multiple axon paths, and multiple dendrite paths. Each synapse is at a cross-point junction of the interconnect network between a dendrite path and an axon path. The computer-useable storage medium has a computer-readable program. The program upon being processed on a computer causes the computer to implement the steps of interconnecting one or more source electronic neurons with one or more target electronic neurons via the interconnect network, routing output from a source electronic neuron to one or more selected axon paths using a routing module maintaining routing information, and configuring each synapse to provide a desired level of signal conduction from an axon path of a source electronic neuron to a dendrite path of a target electronic neuron.

Embodiments of the invention provide a neural network circuit that provides locality and massive parallelism to enable a low-power, compact hardware implementation.

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

FIG. 1A illustrates an example core module 10, in accordance with an embodiment of the invention. The core module 10 comprises a plurality of neurons 11 and a plurality of incoming axons 15. Specifically, the number of neurons 11 is equal to N, and the number of incoming axons 15 is equal to N, wherein N is an integer greater than or equal to one. The neurons 11 and the incoming axons 15 are interconnected via an N×N crossbar 12 comprising intra-core electronic synapse devices ("synapses") 31, wherein "x" represents multiplication. Each synapse 31 interconnects an incoming axon 15 to a neuron 11, wherein, with respect to the synapse 31, the incoming axon 15 and the neuron 11 represent an axon of a pre-synaptic neuron and a dendrite of a post-synaptic neuron, respectively. Each synapse 31 and each neuron 11 has configurable operational parameters.

The core module 10 is a uni-directional core. Each neuron 11 receives firing events via interconnected incoming axons and, in response to the firing events received, generates a firing event according to a neuronal activation function. For each neuron 11, the firing event generated by said neuron 11 propagates along the corresponding outgoing axon 13 of said neuron 11. A preferred embodiment for the neuronal activation function can be leaky integrate-and-fire.

In one embodiment of the invention, when neurons 11 generate a firing event, they maintain a postsynaptic-STDP (post-STDP) variable that decays. For example, in one embodiment, the decay period may be 50 ms. The post-STDP variable is used to achieve STDP by encoding the time since the last firing of an associated neuron 11. Such STDP is used to control long-term potentiation or "potentiation", which in this context is defined as increasing synaptic conductance. When incoming axons 15 generate a firing event, they maintain a presynaptic-STDP (pre-STDP) variable that decays in a similar fashion as that of neurons 11.

Pre-STDP and post-STDP variables may decay according to exponential, linear, polynomial, or quadratic functions, for example. In another embodiment of the invention, variables may increase instead of decrease over time. In any event, a variable may be used to achieve STDP by encoding the time since the last firing of an associated neuron 11. STDP is used to control long-term depression or "depression", which in this context is defined as decreasing synaptic conductance. Note that the roles of pre-STDP and post-STDP variables can be reversed with pre-STDP implementing potentiation and post-STDP implementing depression.

An external two-way communication environment may supply sensory inputs and consume motor outputs. The neurons 11 and incoming axons 15 are implemented using complementary metal-oxide semiconductor (CMOS) logic gates that receive firing events and generate a firing event according to the neuronal activation function. In one embodiment, the neurons 11 and incoming axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target incoming axons 15, wherein the target incoming axons 15 may reside in the same core module 10 or somewhere else in a larger system with many core modules 10.

As shown in FIG. 1A, the core module 10 further comprises an address-event receiver (Core-to-Axon) 4, an address-event transmitter (Neuron-to-Core) 5, and a controller 6 that functions as a global state machine (GSM). The address-event receiver 4 receives firing events and transmits them to target incoming axons 15. The address-event transmitter 5 transmits firing events generated by the neurons 11 to the core modules 10 including the target incoming axons 15.

The core module 10 receives and transmits one firing event at a time. From zero to all incoming axons 15 can be stimulated in a time-step, but each one incoming axon 15 only receives one event in one time-step. Further, from zero to all neurons 11 can fire in one time-step, but each neuron 11 fires once in a time-step. As such, each incoming axon 15 receives events from a single neuron 11, otherwise, two neurons 11 may fire in the same time-step. Further, a neuron 11 may target several different incoming axons 15.

The controller 6 sequences event activity within a time-step. The controller 6 divides each time-step into operational phases in the core module 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1A, the core module 10 further comprises a routing fabric 70. The routing fabric 70 is configured to selectively route neuronal firing events among core modules 10. The routing fabric 70 comprises a firing events address lookup table (LUT) module 57, a packet builder (PB) module 58, a head delete (HD) module 53, and a core-to-core packet switch (PSw) 55. The LUT 57 is an N address routing table is configured to determine target incoming axons 15 for firing events generated by the neurons 11 in the core module 10. The target incoming axons 15 may be incoming axons 15 in the same core module 10 or other core modules 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target incoming axons 15.

The PB 58 packetizes the routing information retrieved by the LUT 57 into outgoing address-event router packets. The core-to-core PSw 55 is an up-down-left-right mesh router configured to direct the outgoing address-event router packets to the core modules 10 containing the target incoming axons 15. The core-to-core PSw 55 is also configured to receive incoming address-event router packets from the core modules 10. The HD 53 removes routing information from an incoming address-event router packet to deliver it as a time stamped firing event to the address-event receiver 4.

In one example implementation, the core module 10 may comprise 256 neurons 11. The crossbar 12 may be a 256× 256 ultra-dense crossbar array that has a pitch in the range of about 0.1 nm to 10 μm. The LUT 57 of the core module 10 may comprise 256 address entries, each entry of length 32 bits.

Figure 1B:
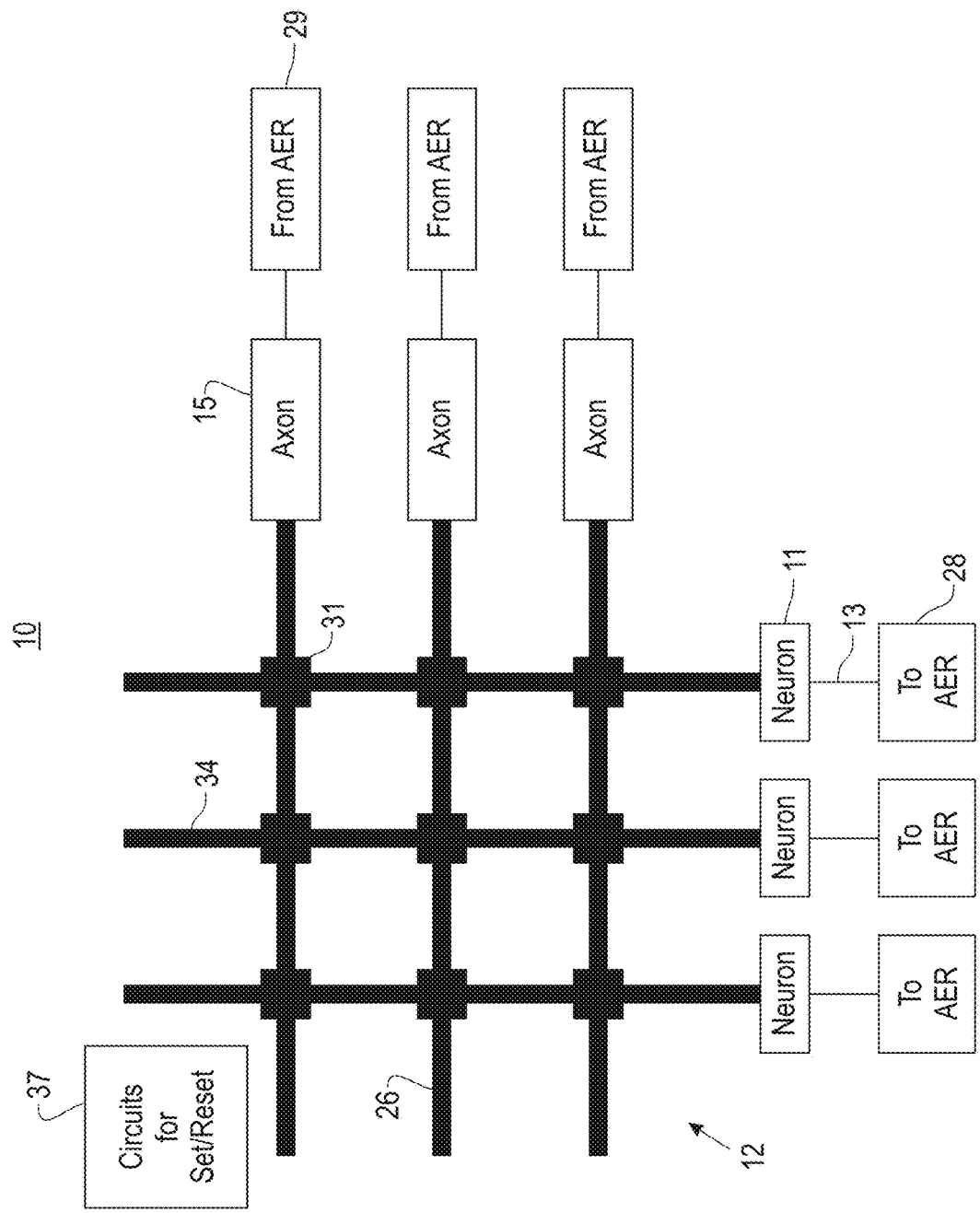
FIG. 1B illustrates an exploded view of a crossbar of a core module, in accordance with an embodiment of the invention.

FIG. 1B illustrates an exploded view of the crossbar 12 of the core module 10, in accordance with an embodiment of the invention. The crossbar 12 comprises axon paths/wires 26 and dendrite paths/wires 34. Each incoming axon 15 is connected to an axon path 26. Each neuron 11 is connected to a dendrite path 34. The synapses 31 are located at cross-point junctions of each axon path 26 and each dendrite path 34. As such, each connection between an axon path 26 and a dendrite path 34 is made through a digital synapse 31. Circuits 37 for setting and/or resetting the synapses 31 are peripheral electronics that are used to load learned synaptic weights into the core module 10.

In one embodiment, soft-wiring in the core module 10 is implemented using address events which are non-deterministic (e.g., Address-Event Representation (AER)). "To AER" modules 28 and "From AER" modules 29 facilitate communication between multiple core modules 10. Firing events arrive via "From AER" modules 29, and propagate via the axon paths 26 to the dendrite paths 34. The neurons 11 fire when they receive (i.e., in response to receiving) sufficient inputs from connected dendrite paths 34. The neurons 11 send firing events to target incoming axons 15 via "To AER" modules 28. When a neuron 11 fires, the neuron 11 communicates the firing event to a "To AER" module 28 which in turn communicates with a "From AER" module 29. Specifically, the HD 53 (FIG. 1A) of the core module 10 receives firing events from a "From AER" module 29. The PB 58 (FIG. 1A) of the core module 10 sends firing events to a "To AER" module 28.

Figure 2A:
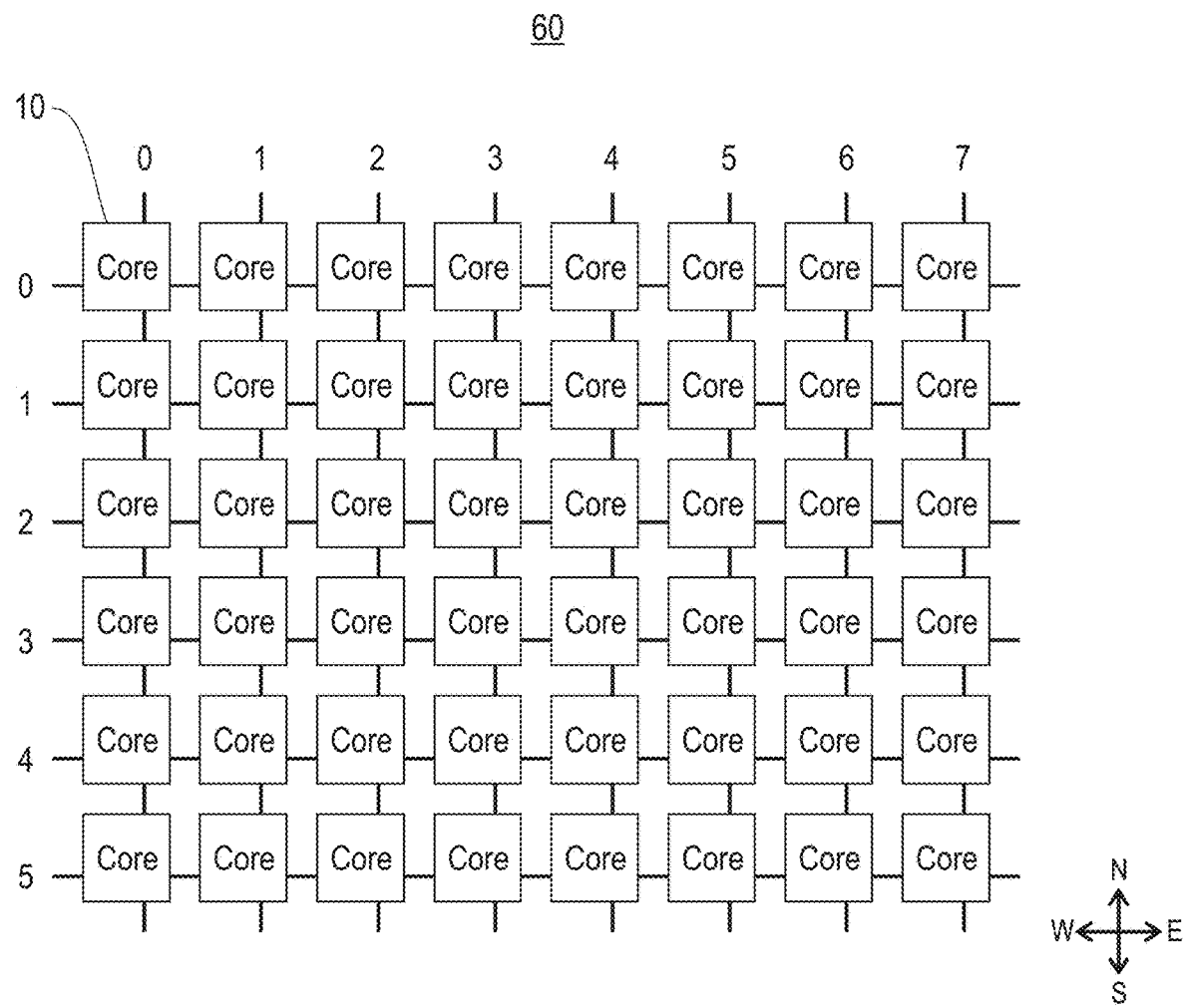
FIG. 2A illustrates an example neural network circuit including multiple interconnected core modules in a scalable low power network, in accordance with an embodiment of the invention.

FIG. 2A illustrates an example neural network circuit 60 including multiple interconnected core modules 10 in a scalable low power network, in accordance with an embodiment of the invention. The core modules 10 are arranged in a 6×8 array. Each core module 10 may be identified by its Cartesian coordinates as core (i, j), where i is a column index and j is a row index in the array (i.e., core (0,0), core (0,1), . . . , (core 5,7)).

Each core module 10 utilizes its core-to-core PSw 55 (FIG. 1A) to pass along neuronal firing events in the eastbound, westbound, northbound, or southbound direction. For example, a neuron 11 (FIG. 1A) in the core module (0,0) may generate a firing event for routing to a target incoming axon 15 (FIG. 1A) in the core module (5,7). To reach the core module (5,7), the firing event may traverse seven core modules 10 in the eastbound direction (i.e., from core (0,0) to cores (0,1), (0,2), (0,3), (0,4), (0,5), (0,6), and (0,7)), and five core modules 10 in the southbound direction (i.e., from core (0,7) to cores (1, 7), (2, 7), (3, 7), (4, 7), and (5, 7)) via the core-to-core PSws 55 in the neural network 60.

Figure 2B:
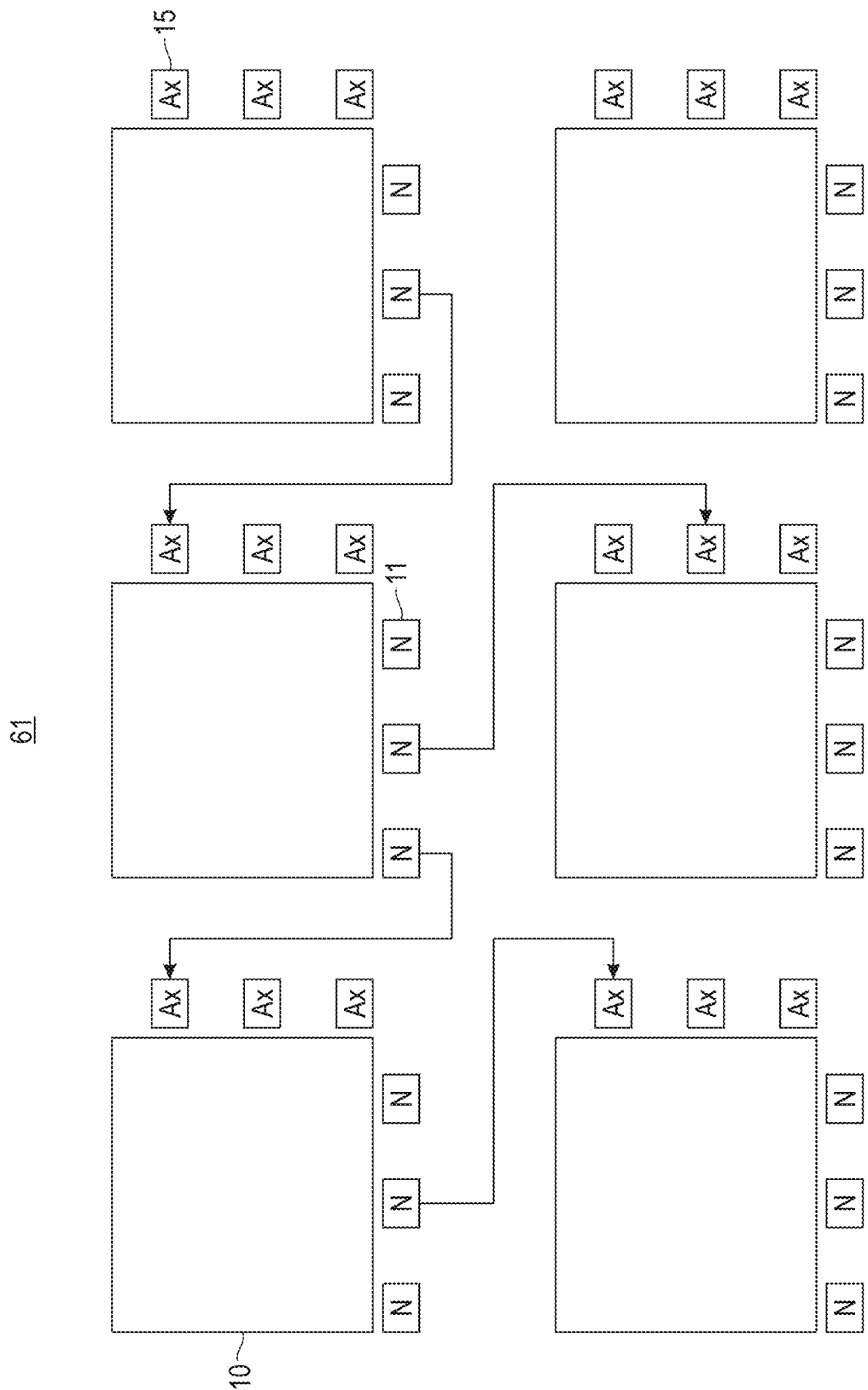
FIG. 2B illustrates inter-core communication in an example neural network circuit including multiple interconnected core modules in a scalable low power network, in accordance with an embodiment of the invention.

FIG. 2B illustrates inter-core communication in an example neural network circuit 61 including multiple interconnected core modules 10 in a scalable low power network, in accordance with an embodiment of the invention. Intra-core communication or short-distance connectivity within a core module 10 is implemented physically. Inter-core communication or long-distance connectivity between core modules 10 is implemented.

Figure 3:
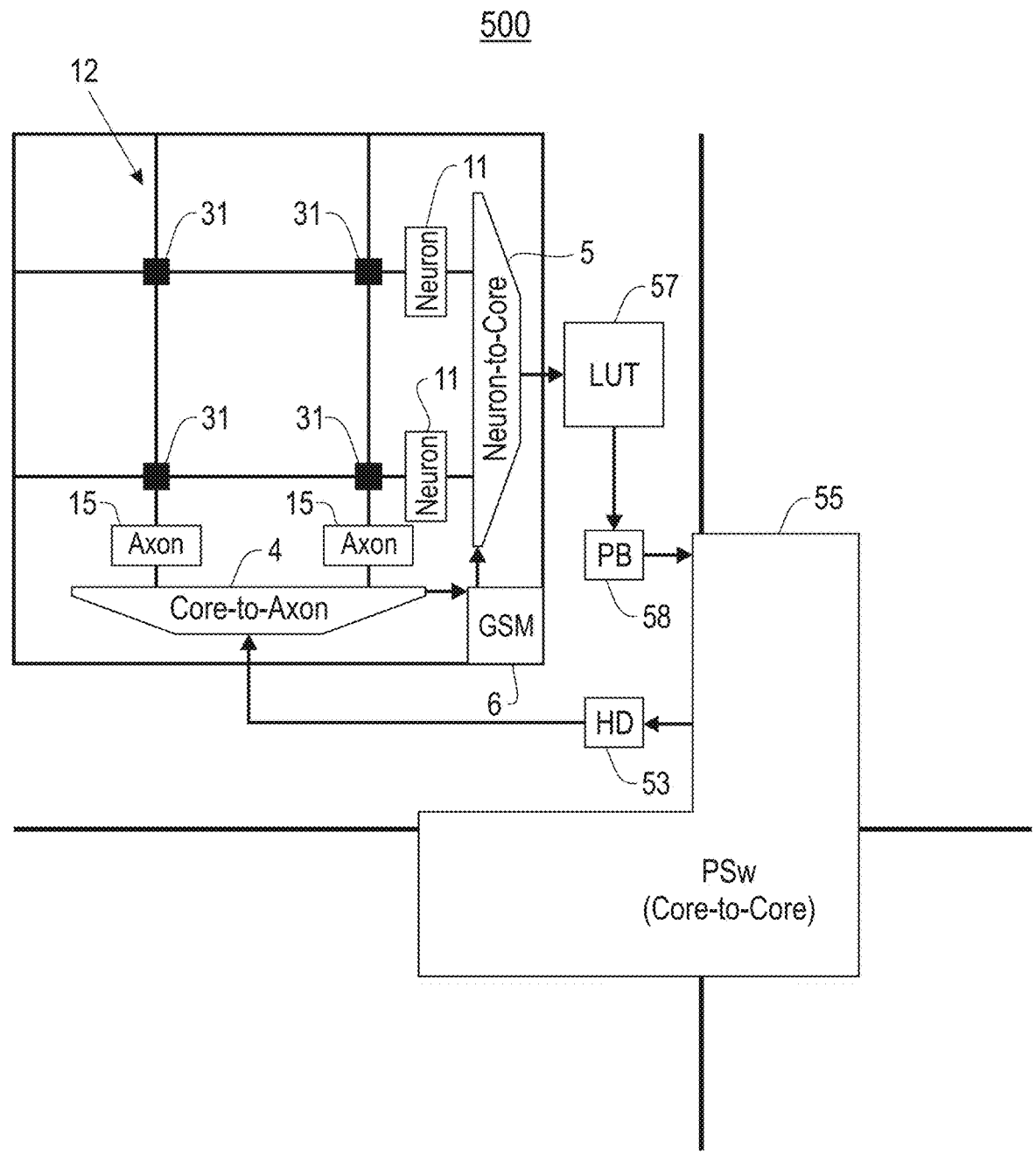
FIG. 3 illustrates a reflected core module, in accordance with an embodiment of the invention.

FIG. 3 illustrates a reflected core module 500, in accordance with an embodiment of the invention. The reflected core module 500 comprises the same components as a core module 10 (FIG. 1A). Unlike the core module 10, however, the components in the reflected core module 500 are positioned such that they represent a reflection of the components in the core module 10. For instance, the incoming axons 15 and the neurons 11 in the reflected core module 500 are positioned where the neurons 11 and the incoming axons 15 in the core module 10 are positioned, respectively. Likewise, the address-events transmitter 5 and the address-events receiver 4 are positioned in the reflected core module 500 where the address-events receiver 4 and the address-events transmitter 5 in the core module 10 are positioned, respectively.

Figure 4:
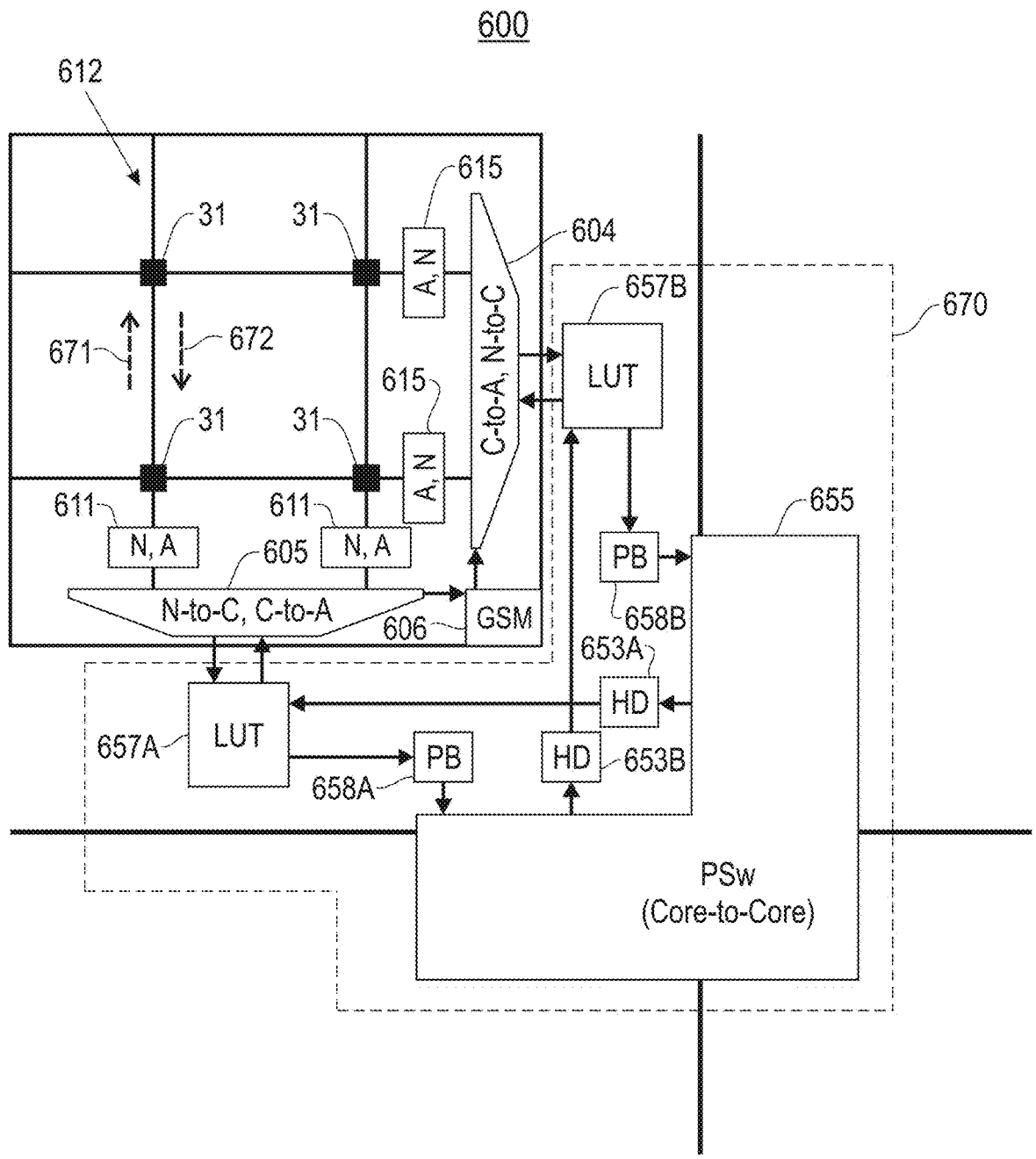
FIG. 4 illustrates a functional neural core circuit, in accordance with an embodiment of the invention.

FIG. 4 illustrates a functional neural core circuit 600, in accordance with an embodiment of the invention. The functional neural core circuit 600 comprises a core module 10 (FIG. 1A) and a reflected core module 500 (FIG. 3). The core modules 10 and 500 are logically overlayed on one another such that neurons 11 (FIG. 1A) in the core module 10 are proximal to incoming axons 15 (FIG. 3) in the reflected core module 500. This proximity results in neuron-axon pairs 611. Similarly, incoming axons 15 (FIG. 1A) in the core module 10 are proximal to neurons 11 (FIG. 3) in the core module 500 such that axon-neuron pairs 615 are formed. This proximity results in axon-neuron pairs 615.

The functional neural core circuit 600 further comprises an interconnection network 612 interconnecting the neuron-axon pairs 611 to the axon-neuron pairs 615. In one embodiment of the invention, the interconnection network 612 comprises an electronic synapse array comprising multiple electronic synapse devices ("synapses") 31. Each synapse 31 interconnects an incoming axon 15 in an axon-neuron pair 615 to a neuron 11 in a neuron-axon pair 611, and also interconnects an incoming axon 15 in a neuron-axon pair 611 to a neuron 11 in an axon-neuron pair 615. With respect to the synapse 31, the incoming axon 15 and the neuron 11 represent an axon of a pre-synaptic neuron and a dendrite of a post-synaptic neuron, respectively. Each synapse 31 and each neuron 11 has configurable operational parameters.

In another embodiment of the invention, the interconnection network 612 comprises a first electronic synapse array corresponding to the core module 10, and a second electronic synapse array corresponding to the reflected core module 500. Each synapse array comprises multiple synapses 31. Each synapse 31 in the first electronic synapse array interconnects an incoming axon 15 in an axon-neuron pair 615 to a neuron 11 in a neuron-axon pair 611. Each synapse 31 in the second electronic synapse array interconnects an incoming axon 15 in a neuron-axon pair 611 to a neuron 11 in an axon-neuron pair 615. With respect to each synapse 31, the incoming axon 15 and the neuron 11 represent an axon of a pre-synaptic neuron and a dendrite of a post-synaptic neuron, respectively.

Each neuron 11 in a neuron-axon pair 611 or an axon-neuron pair 615 receives firing events via interconnected axons and, in response to the firing events received, generates a firing event according to a neuronal activation function. The synapses 31 in the functional neural core circuit 600 have synaptic weights, the synaptic weights learned as a function of the firing events propagating through the interconnection network 612.

The functional neural core circuit 600 is a bi-directional core circuit. Information propagates through the interconnection network 612 in two directions (e.g., top-down, bottom-up). In one embodiment, the functional neural core circuit 600 may use time division multiple access (TDMA). In one phase of a time-step, a first set of axonal firing events propagates through the synapses 31 in a first direction represented by an arrow 671 in FIG. 4. In another phase of the same time-step, a second set of axonal firing events propagates through the synapses 31 in a second direction (i.e., a direction opposite to the first direction) represented by an arrow 672 in FIG. 4. The synaptic weights of the synapses 31 are learned as a function of the first set of axonal firing events and the second set of axonal firing events.

As shown in FIG. 4, the functional neural core circuit 600 further comprises a controller 606 that functions as a global state machine (GSM). The controller 606 sequences event activity within a time-step. The controller 606 divides each time-step into operational phases in the functional neural core circuit 600 for neuron updates, etc. As shown in FIG. 4, the functional neural core circuit 600 further a first address-event transmitter-receiver (N-to-C, C-to-A) 605 for the neuron-axon pairs 611, and a second address-event transmitter-receiver (C-to-A, N-to-C) 605 for the axon-neuron pairs 615. The address-event transmitter-receivers 605 and 604 transmit neuronal firing events generated by the neurons 11 in the neuron-axon pairs 611 and the axon-neuron pairs 615, respectively. The address-event transmitter-receivers 605 and 604 also receive firing events and transmit them to target incoming axons in the neuron-axon pairs 611 and the axon-neuron pairs 615, respectively.

As shown in FIG. 4, the functional neural core circuit 600 further comprises a routing fabric 670. The routing fabric 670 is configured to selectively route neuronal firing events among functional neural core circuits 600 based on a reconfigurable hierarchical organization of the functional neural core circuits 600. The routing fabric 670 comprises, for the neuron-axon pairs 611, a first firing events address LUT module 657A, a first PB module 658A, and a first HD module 653A. The router 670 further comprises, for the axon-neuron pairs 615, a second firing events address LUT module 657B, a second PB module 658B, and a second HD module 653B.

The LUTs 657A and 657B are configured to determine target incoming axons 15 for firing events generated by the neurons 11 in the neuron-axon pairs 611 and the axon-neuron pairs 615, respectively. The target incoming axons 15 may be incoming axons 15 in the same functional neural core circuit 600 or other functional neural core circuits 600. Each LUT 657A, 657B retrieves information such as target distance, direction, addresses, and delivery times (e.g., about 19 bits/packet×4 packets/neuron). Each LUT 657A, 657B converts firing events generated by the neurons 11 into forwarding addresses of the target incoming axons 15. The PBs 658A and 658B packetizes the routing information retrieved by the LUTs 657A and 657B, respectively, into outgoing address-event router packets.

Each LUT 657A, 657B is reconfigurable and comprises a sparse cross-bar 660 (FIG. 7) that is adaptive as a function of learning rules, such that each neuron 11 corresponding to said LUT is connected to only one output line. The LUTs 657A and 657B are also configured to receive firing events and transmit them to target incoming axons 15 in the neuron-axon pairs 611 and the axon-neuron pairs 615, respectively.

Also shown in FIG. 4, the routing fabric 670 further comprises a core-to-core packet switch (PSw) 655. The core-to-core PSw 655 directs the outgoing address-event router packets to the functional neural core circuits 600 containing the target incoming axons 15. The core-to-core PSw 655 is also configured to receive incoming address-event router packets from other functional neural core circuits 600. The HDs 653A and 653B remove routing information from an incoming address-event router packet to deliver it as a time stamped firing event to the address-event transmitter-receivers 605 and 604, respectively.

Figure 5:
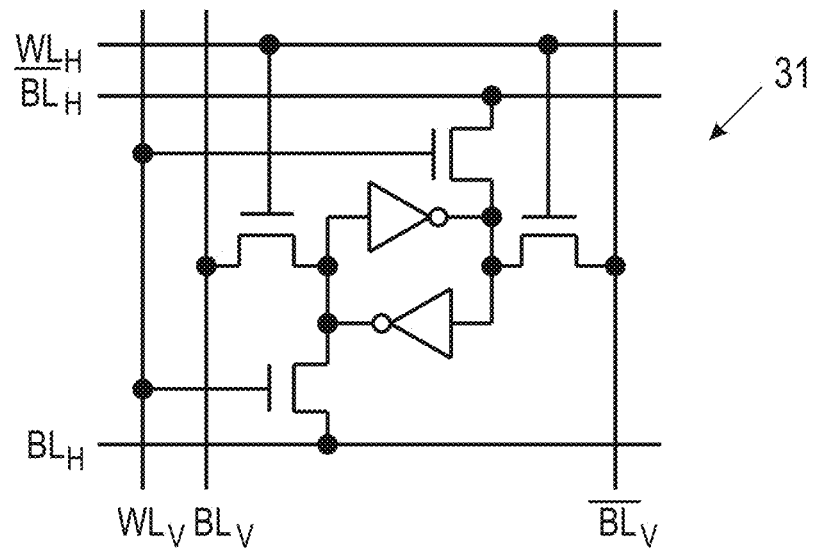
FIG. 5 illustrates a schematic diagram of a synapse, in accordance with an embodiment of the invention.

FIG. 5 illustrates a diagram of a synapse 31, in accordance with an embodiment of the invention. Each synapse 31 comprises a static random access memory (SRAM) cell that permits reading and updating synaptic weights along the axons and the neurons. In one example implementation, a 1-bit transposable cell is utilized for pre-synaptic (row) and post-synaptic (column) synapse updates. $WL_H$ stands for horizontal (axonal) wordlines and $BL_H$ stands for horizontal (axonal) bitlines as for memory arrays. $WL_V$ stands for vertical (neuronal) wordlines and $BL_V$ stands for vertical (neuronal) bitlines as for memory arrays. $WL_H$, $BL_H$, $\overline{BL}_H$ (inversion of $BL_H$) are used for axonal updates of the synapse 31, and $WL_V$, $BL_V$, $\overline{BL}_V$ are used for neuronal updates of the synapse 31.

In another example implementation, each synapse 31 comprises 2-bit inter-digitated cells.

Figure 6:
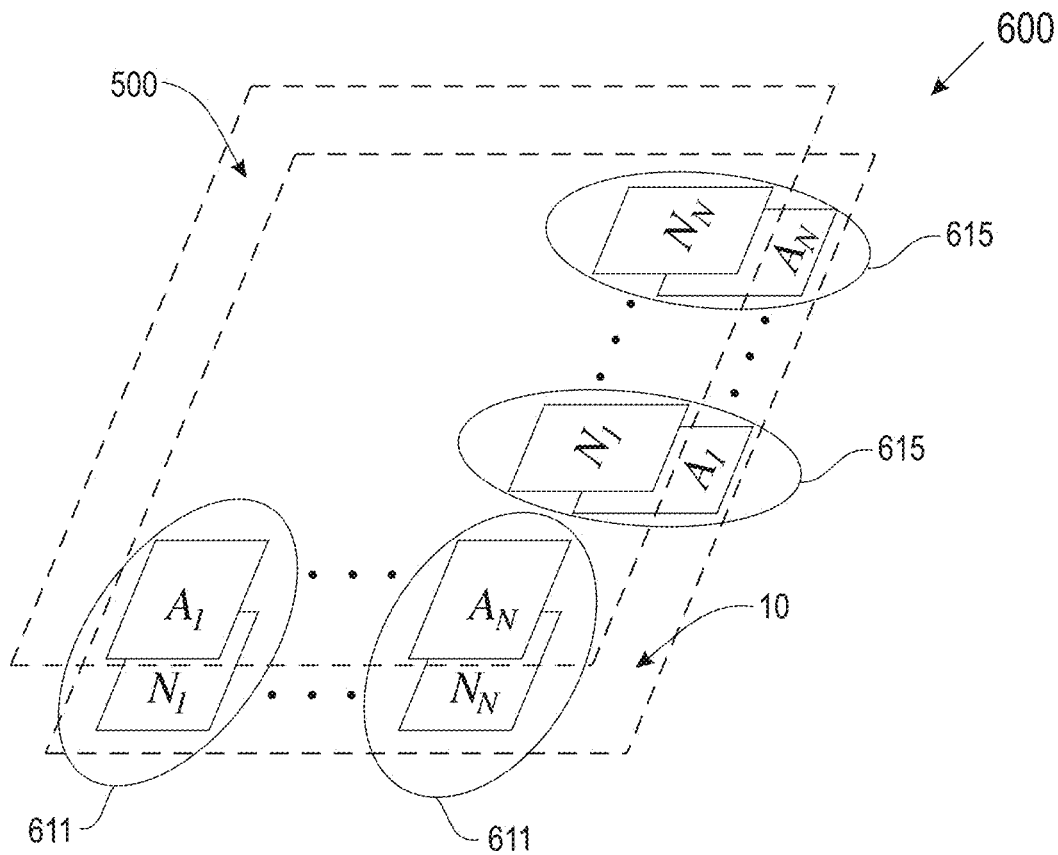
FIG. 6 illustrates a block diagram of two core modules logically overlayed on one another in a functional neural core circuit, in accordance with an embodiment of the invention.

FIG. 6 illustrates a block diagram of the core modules 10 and 500 logically overlayed on one another in the functional neural core circuit 600, in accordance with an embodiment of the invention. As shown in this figure, each core module 10, 500 comprises neurons 11 ($N_1, \ldots, N_N$) and incoming axons 15 ($A_1, \ldots, A_N$). Each neuron-axon pair 611 includes a neuron 11 in the core module 10 and an incoming axon 15 in the core module 500, wherein the neuron 11 in the core module 10 is proximal to the incoming axon 15 in the core module 500. Each axon-neuron pair 615 comprises an incoming axon 15 in the core module 10 and a neuron 11 in the core module 500, wherein the incoming axon 15 in the core module 10 is proximal to the neuron 11 in the core module 500. The proximity of a neuron 11 to an incoming axon 15 in a neuron-axon pair 611 or an axon-neuron pair 615 enables the sharing of information about neuronal and axonal activations and the use of such information for synaptic learning.

Figure 7:
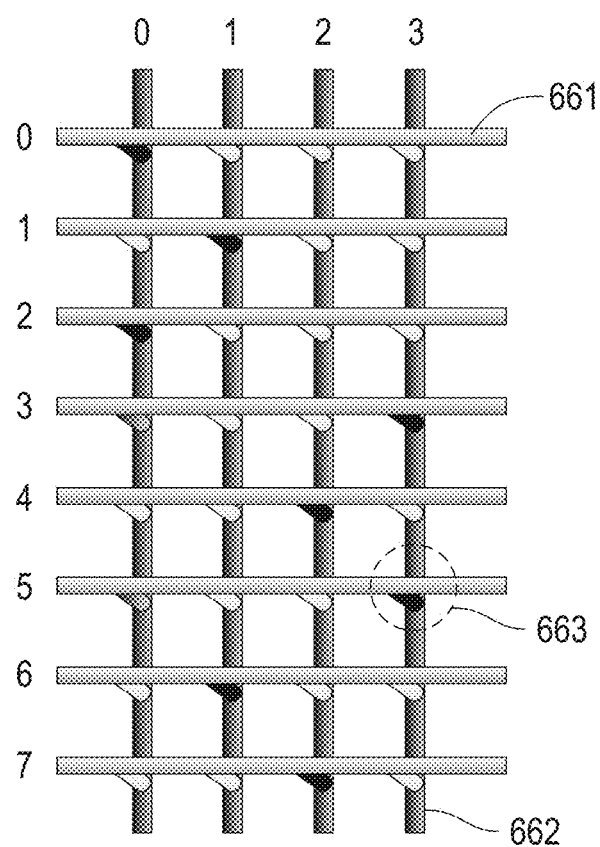
FIG. 7 illustrates a sparse cross-bar, in accordance with an embodiment of the invention.

FIG. 7 illustrates a sparse cross-bar 660, in accordance with an embodiment of the invention. As described above, each LUT 657A (FIG. 4), 657B (FIG. 4) comprises a sparse cross-bar 660. The sparse cross-bar 660 comprises multiple rows representing horizontal wires 661 and multiple columns representing vertical wires 662. Each horizontal wire 661 represents a neuron 11 (FIG. 1A), and each vertical wire represents a target incoming axon 15 (FIG. 1A).

The sparse cross-bar 660 further comprises multiple 1-value synapses 663. Each 1-value synapse 663 may be identified by its Cartesian coordinates as 1-value synapse (j, i), where i is a column index and j is a row index in the crossbar (i.e., 1-value synapse (0, 0), (1, 1), (2, 0), (3, 3), (4, 2), (5, 3), (6, 1), and (7, 2)). Each 1-value synapse 663 interconnects a neuron 11 to a target incoming axon 15. Specifically, a neuron 11 represented by horizontal wire 0 is connected to an incoming axon 15 represented by vertical wire 0, a neuron 11 represented by horizontal wire 1 is connected to an incoming axon 15 represented by vertical wire 1, and so forth. The sparse cross-bar 660 is adaptive as a function of learning rules, thus allowing for structural plasticity. In a preferred embodiment, each neuron 11 will connect to one and only one incoming axon 15 via the cross-bar 660, and every incoming axon 15 will receive a connection from one and only one neuron 11.

Figure 8:
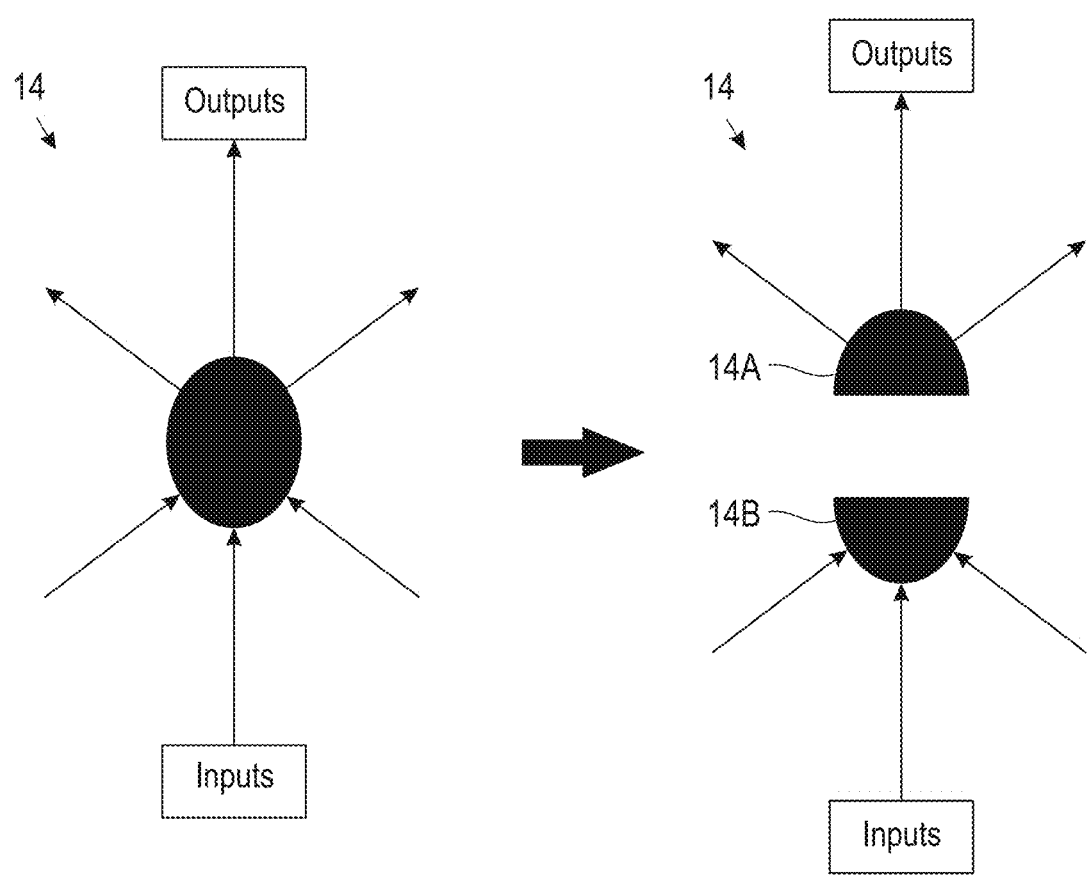
FIG. 8 illustrates an example neuron, in accordance with an embodiment of the invention.

FIG. 8 shows an example neuron 14, in accordance with an embodiment of the invention. The example neuron 14 has three inputs and three outputs. The neuron 14 can be logically divided into an input part 14A and an output part 14B.

Figure 9:
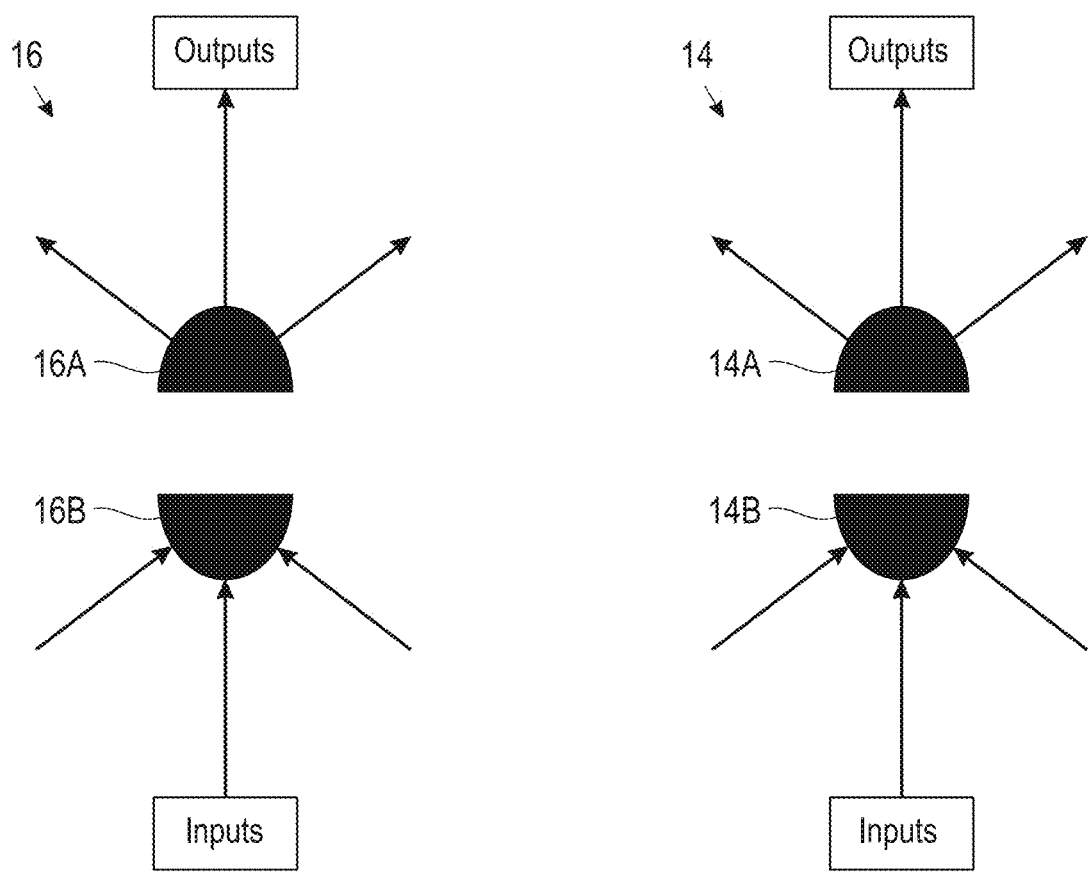
FIG. 9 illustrates two example neurons, in accordance with an embodiment of the invention.

FIG. 9 shows two example neurons 14 and 16, in accordance with an embodiment of the invention. The neuron 14 is logically divided into input parts 14A and 14B. Similarly, the neuron 16 is logically divided into input parts 16A and 16B.

Figure 10:
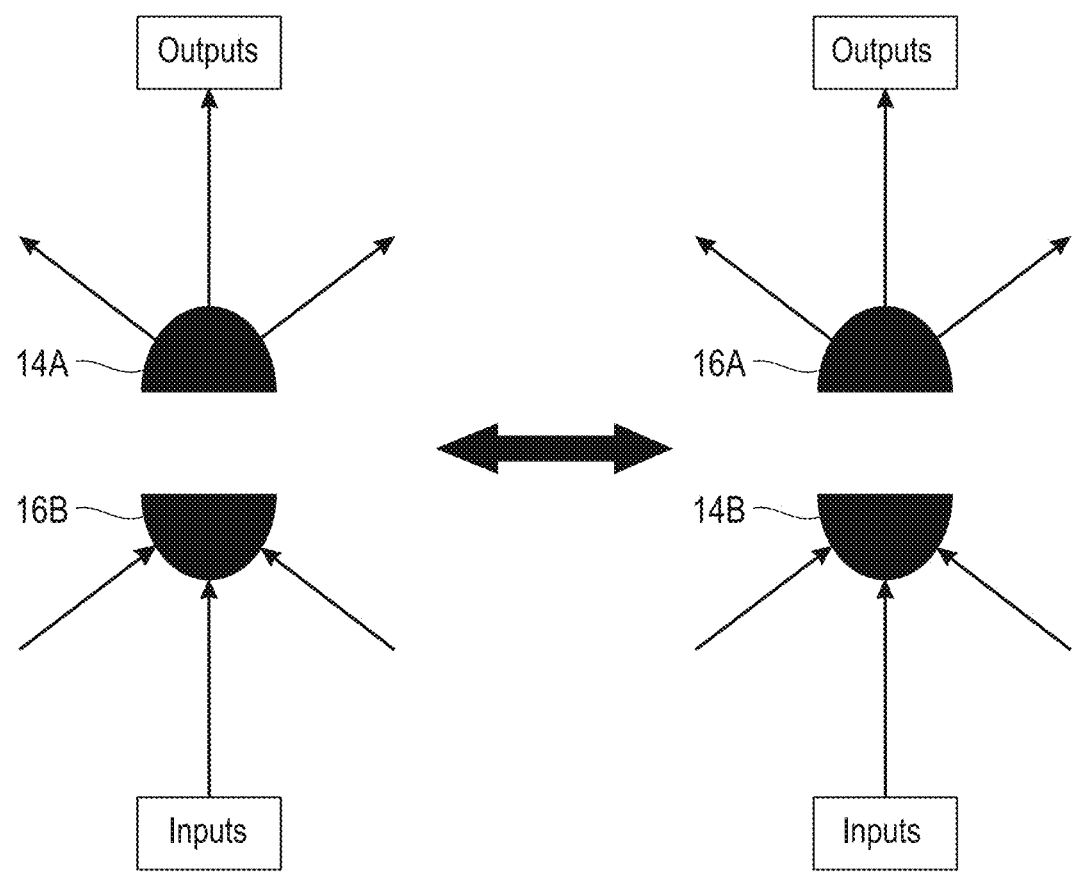
FIG. 10 illustrates the neurons in FIG. 9, in accordance with an embodiment of the invention.

FIG. 10 shows the neurons 14 and 16 in FIG. 9, in accordance with an embodiment of the invention. Each LUT 657A (FIG. 4), 657B (FIG. 4) may be programmed to allow the input part 16B of the neuron 16 in FIG. 9 to be routed to the output part 14A of the neuron 14 in FIG. 9. The input part 14B of the neuron 14 in FIG. 9 may also be routed to the output part 16A of the neuron 16 in FIG. 9. As such, though the two neurons 14 and 16 are not physically fully connected, the reprogrammable LUTs allow routing of messages between different inputs/outputs of the neurons at different times as needed to approximate a fully connected system while using very sparse projection and connectivity between the neurons.

Figure 11:
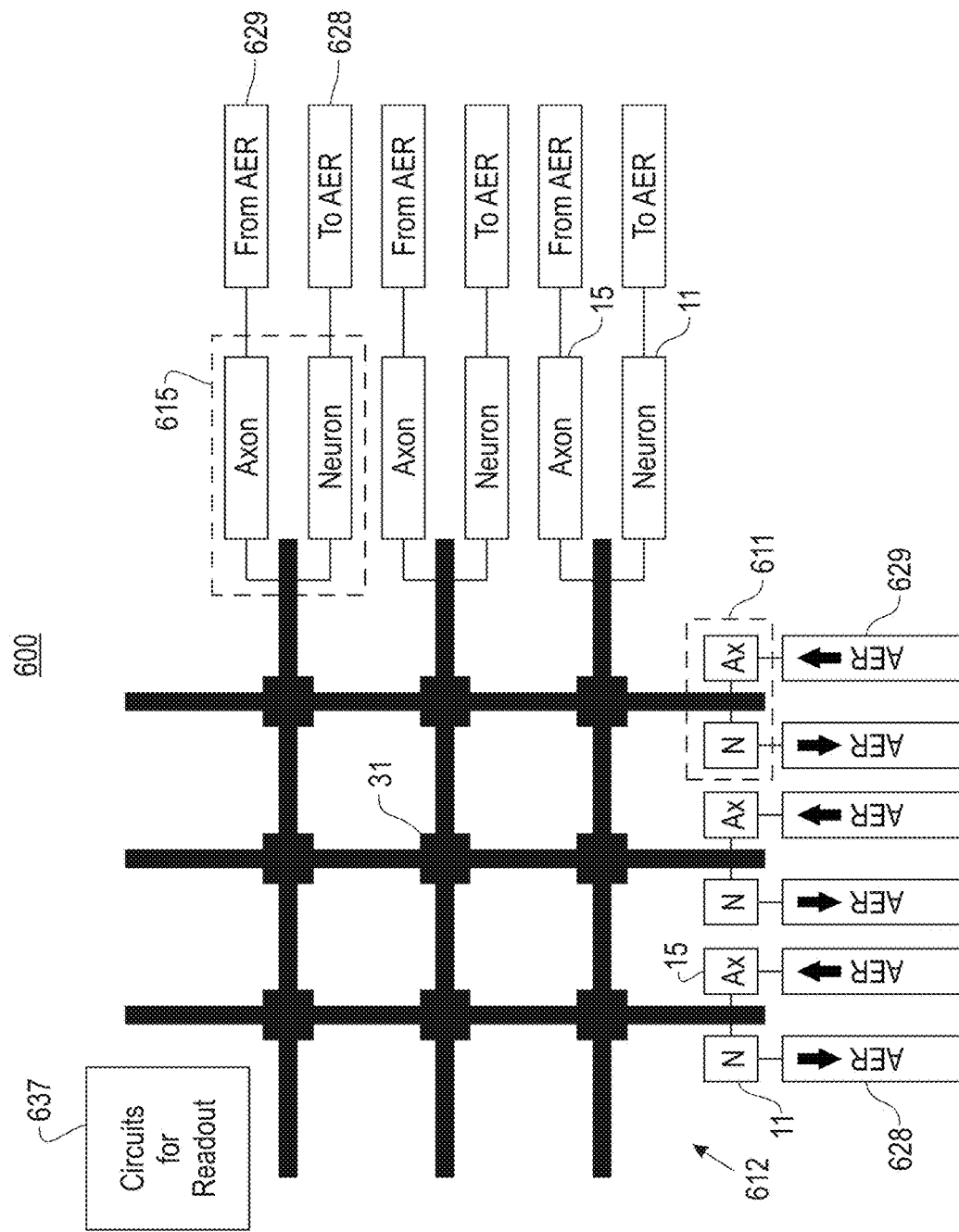
FIG. 11 illustrates an exploded view of an interconnection network of a functional neural core circuit, in accordance with an embodiment of the invention.

FIG. 11 illustrates an exploded view of the interconnection network 612 of the functional neural core circuit 600, in accordance with an embodiment of the invention. Each synapse 31 interconnects an incoming axon 15 to a neuron 11. Specifically, a synapse 31 may interconnect an incoming axon 15 is an axon-neuron pair 615 to a neuron 11 in a neuron-axon pair 611. A synapse 31 may also interconnect an incoming axon 15 in a neuron-axon pair 611 to a neuron 11 in an axon-neuron pair 615. With respect to the synapse 31, the incoming axon 15 and the neuron 11 represent an axon of a pre-synaptic neuron and a dendrite of a post-synaptic neuron, respectively. As stated above, each synapse 31 may comprise a 1-bit transposable cell or 2-bit inter-digitated cells. Circuits 637 for setting and/or resetting the synapses 31 are peripheral electronics that are used to load learned synaptic weights into the functional neural core circuit 600.

In one embodiment, soft-wiring in the functional neural core circuit 600 is implemented using address events which are non-deterministic (e.g., Address-Event Representation (AER)). "To AER" modules 628 and "From AER" modules 629 facilitate communication between functional neural core circuit 600. Firing events arrive via "From AER" modules 629, and propagate via the interconnection network 612 to the neurons 11. Neurons 11 fire when they receive (i.e., in response to receiving) sufficient inputs, and send firing events to target incoming axons 15 via "To AER" modules 628. When a neuron 11 fires, the neuron 11 communicates the firing event to a "To AER" module 628 which in turn communicates with a "From AER" module 629.

Figure 12:
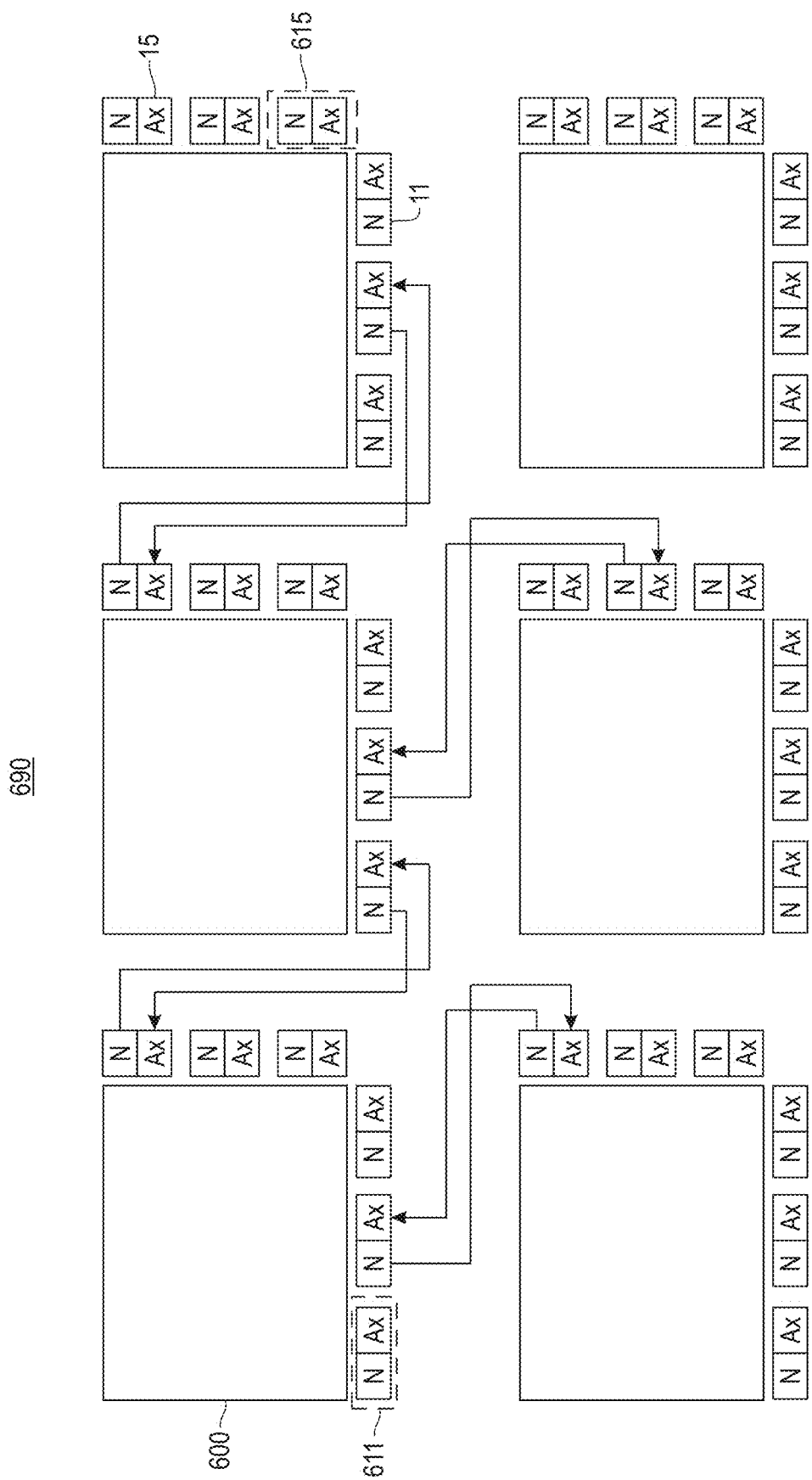
FIG. 12 illustrates inter-core communication in an example neural network circuit including multiple interconnected functional neural core circuits in a scalable low power network, in accordance with an embodiment of the invention.

FIG. 12 illustrates inter-core communication in an example neural network circuit 690 including multiple interconnected functional neural core circuits 600 in a scalable low power network, in accordance with an embodiment of the invention. The functional neural core circuits 600 in the neural network circuit 690 operate in a symmetric manner. For example, as shown in FIG. 12, when a neuron 11 in a neuron-axon pair 611 targets an incoming axon 15 in an axon-neuron pair 615, a neuron 11 proximal to the target incoming axon 15 in the axon-neuron pair 615 targets an incoming axon 15 proximal to the neuron 11 in the neuron-axon pair 611.

Intra-core communication or short-distance connectivity within a functional neural core circuit 600 is implemented physically. Intra-core communication or long-distance connectivity between functional neural core circuits 600 is implemented logically.

In one embodiment, the hierarchical organization of the functional neural core circuits 600 comprises multiple chip structures 700 (FIG. 13), each chip structure 700 comprising a plurality of functional neural core circuits 600.

Figure 13:
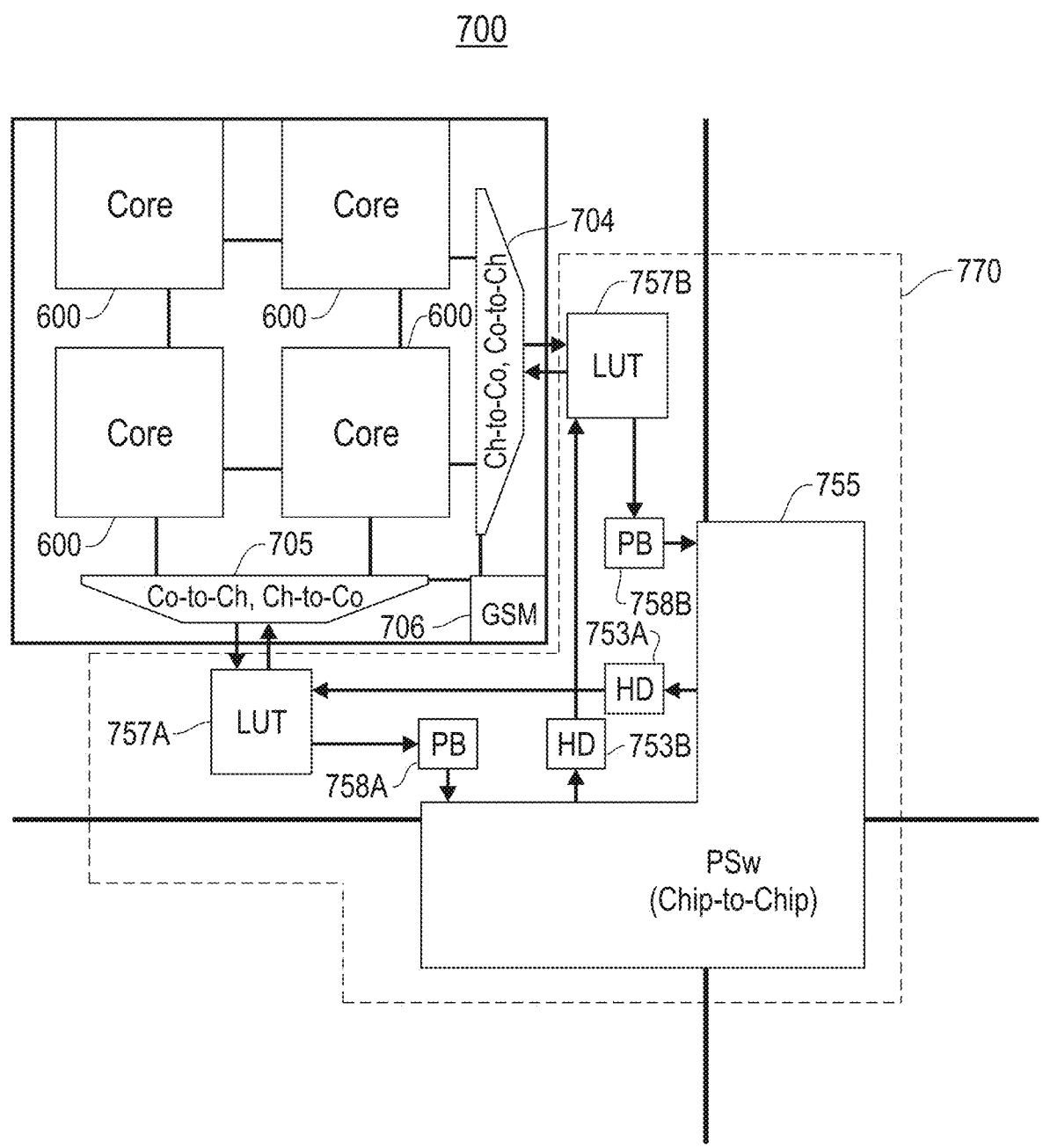
FIG. 13 illustrates a block diagram of a chip structure, in accordance with an embodiment of the invention.

FIG. 13 illustrates a block diagram of a chip structure 700, in accordance with an embodiment of the invention. In one example implementation, the chip structure 700 comprises four functional neural core circuits 600 as shown in FIG. 13. The chip structure 700 further comprises a first address-event transmitter-receiver (Co-to-Ch, Ch-to-Co) 705, a second address-event transmitter-receiver (Ch-to-Co, Co-to-Ch) 704, and a controller 706 that functions as a global state machine (GSM). Each address-event transmitter-receiver 705, 704 receives incoming address-event router packets and transmits them to the functional neural core circuits 600 containing target incoming axons 15. Each address-event transmitter-receiver 705, 704 also transmits outgoing address-event router packets generated by the functional neural core circuits 600. The controller 706 sequences event activity within a time-step, dividing each time-step into operational phases in the chip structure 700 for functional neural core circuit 600 updates, etc.

According to an embodiment of the invention, all functional neural core circuits 600 within a chip structure 700 share a routing fabric 770 comprising a first chip-to-chip LUT module 757A, a second chip-to-chip LUT module 757B, a first chip-to-chip PB module 758A, a second chip-to-chip PB module 758B, a first chip-to-chip HD module 753A, a second chip-to-chip HD module 753B, and a chip-to-chip packet switch (PSw) 755. Each LUT 757A, 757B, each chip-to-chip PB 758A, 758B, each chip-to-chip HD 753A, 753B, and the chip-to-chip PSw 755 provide a hierarchical address-event multi-chip mesh router system, as a deadlock-free dimension-order routing (DR).

Each chip-to-chip LUT 757A, 757B is configured to determine chip structures 700 containing the target incoming axons 15 for outgoing address-event router packets generated by the functional neural core circuits 600. Each chip-to-chip LUT 757A, 757B is also configured to receive incoming address-event router packets.

The chip-to-chip PBs 758A and 758B packetizes the routing information retrieved by the chip-to-chip LUTs 757A and 757B into the outgoing address-event router packets, respectively. The chip-to-chip PSw 755 directs the outgoing address-event router packets to the determined chip structures 700. The chip-to-chip PSw 755 is also configured to receive incoming address-event router packets from chip structures 700. The chip-to-chip HDs 753A and 753B remove some routing information (e.g., chip structure routing information) from an incoming address-event router packet and delivers the remaining incoming address-event router packet to the address-event transmitter-receivers 705 and 704, respectively.

In one embodiment, the hierarchical organization of the functional neural core circuits 600 comprises multiple board structures 800 (FIG. 14), each board structure 800 comprising a plurality of chip structures 700.

Figure 14:
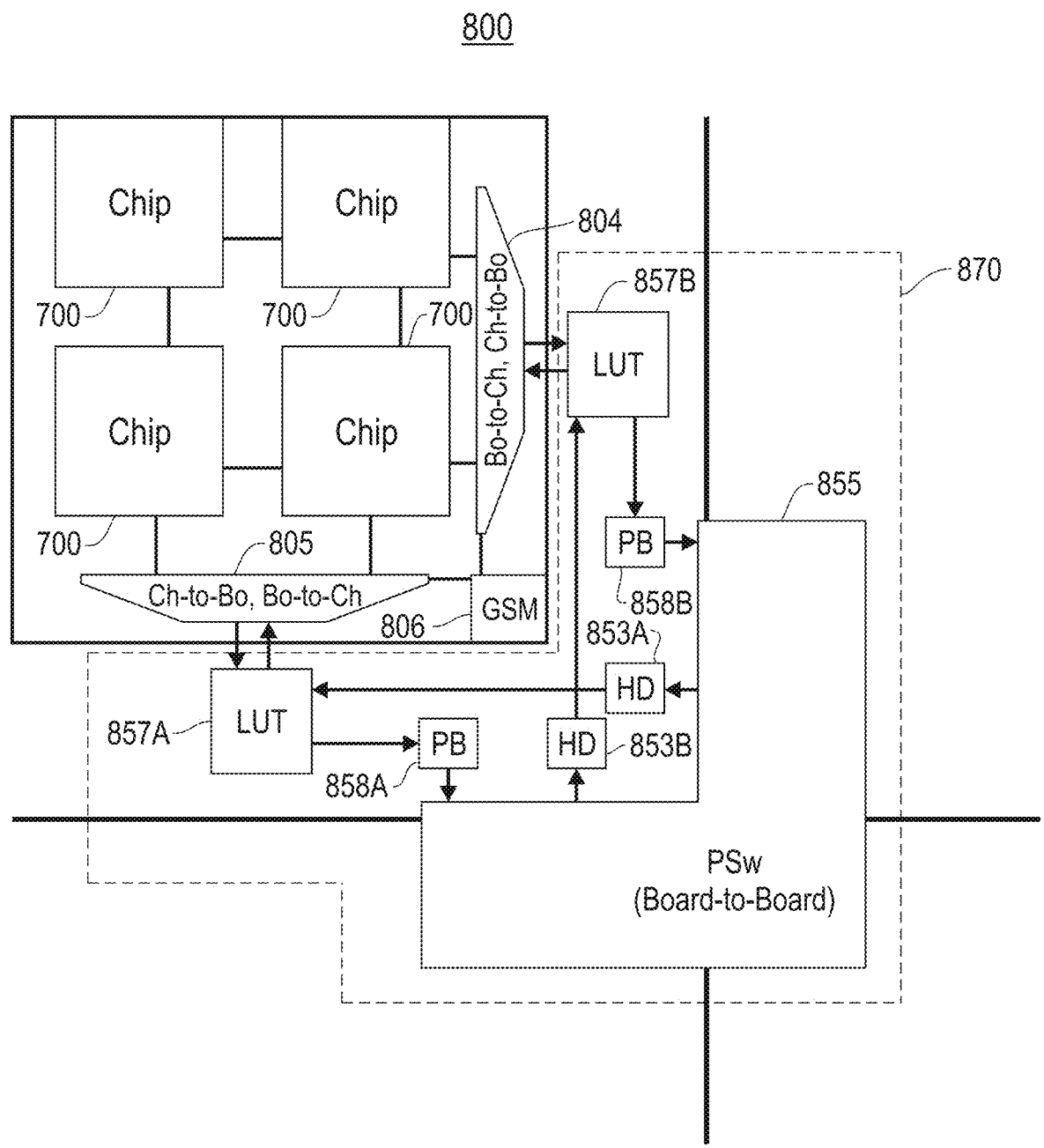
FIG. 14 illustrates a block diagram of a board structure, in accordance with an embodiment of the invention.

FIG. 14 illustrates a block diagram of a board structure 800, in accordance with an embodiment of the invention. In one example implementation, the board structure 800 comprises four chip structures 700 as shown in FIG. 13. The board structure 800 further comprises a first address-event transmitter-receiver (Ch-to-Bo, Bo-to-Ch) 805, a second address-event transmitter-receiver (Bo-to-Ch, Ch-to-Bo) 804, and a controller 806 that functions as a global state machine (GSM). Each address-event transmitter-receiver 805, 804 receives incoming address-event router packets and transmits them to the chip structures 700 containing target incoming axons 15. Each address-event transmitter-receiver 805, 804 also transmits outgoing address-event router packets generated by the chip structures 700. The controller 806 sequences event activity within a time-step, dividing each time-step into operational phases in the board structure 800 for chip structure 700 updates, etc.

According to an embodiment of the invention, all chip structures 700 within a board structure 800 share a routing fabric 870 comprising a first board-to-board LUT module 857A, a second board-to-board LUT module 857B, a first board-to-board PB module 858A, a second board-to-board PB module 858B, a first board-to-board HD module 853A, a second board-to-board HD module 853B, and a board-to-board packet switch (PSw) 855.

Each board-to-board LUT 857A, 857B is configured to determine board structures 800 containing the target incoming axons 15 for outgoing address-event router packets generated by the chip structures 700. Each board-to-board LUT 857A, 857B is also configured to receive incoming address-event router packets.

The board-to-board PBs 858A and 858B packetizes the routing information retrieved by the board-to-board LUTs 857A and 857B into the outgoing address-event router packets, respectively. The board-to-board PSw 855 directs the outgoing address-event router packets to the determined board structures 800. The board-to-board PSw 855 is also configured to receive incoming address-event router packets from board structures 800. The board-to-board HDs 853A and 853B remove some routing information (e.g. board structure routing information) from an incoming address-event router packet and delivers the remaining incoming address-event router packet to the address-event transmitter-receivers 805 and 804, respectively.

Figure 15:
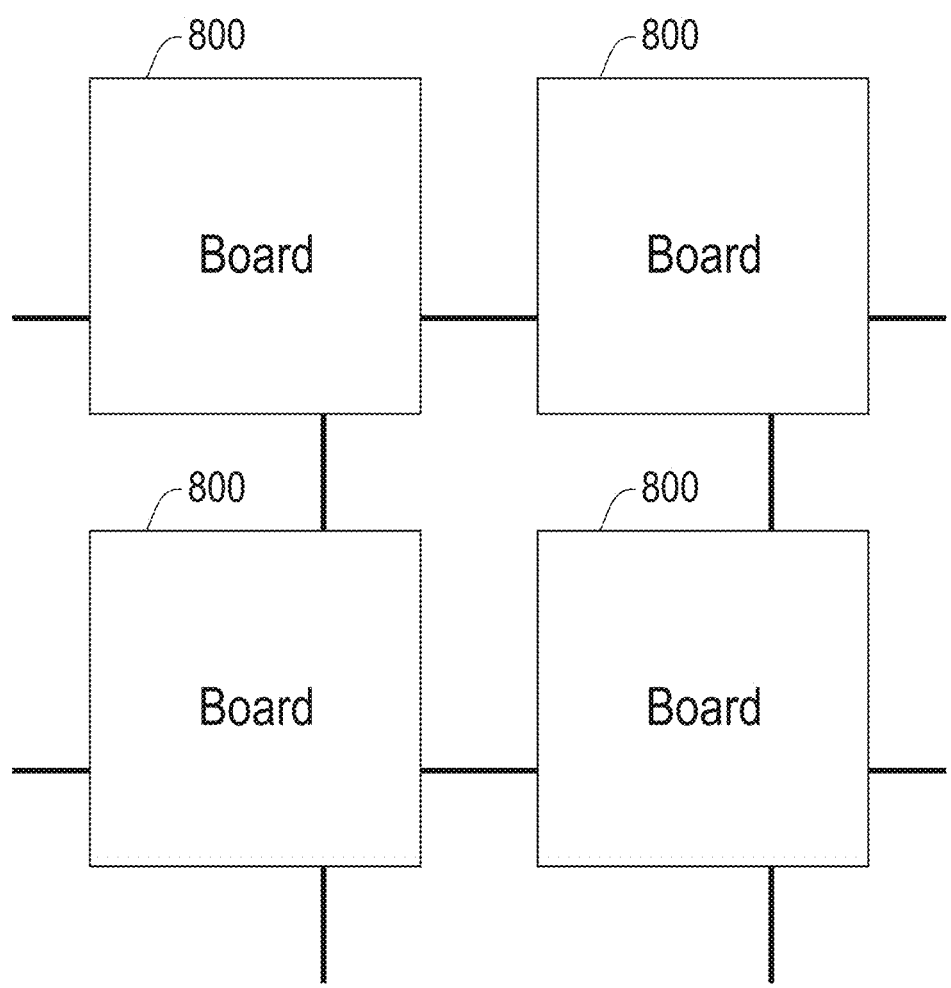
FIG. 15 illustrates an example neural network circuit including multiple interconnected board structures in a scalable low power network, in accordance with an embodiment of the invention.

FIG. 15 illustrates an example neural network circuit 900 including multiple interconnected board structures 800 in a scalable low power network, in accordance with an embodiment of the invention. The neural network circuit 900 is a scalable neuromorphic and synaptronic architecture.

As discussed above, each board structure 800 comprises multiple chip structures 700 (FIG. 13), and each chip structure 700 in turn comprises multiple functional neural core circuits 600 (FIG. 4). An event routing system of the neural network circuit 900 may include the routing fabric 670 (FIG. 4) of each functional neural core circuit 600, the routing fabric 770 (FIG. 13) of each chip structure 700, and the routing fabric 870 (FIG. 14) of each board structure 800.

Packets destined for other networks are routed to inter-chip routers (IR), using the same structure to set target chips/cores/axons. Inter-chip LUT information can be compact as it routes events from the same region, grouped into fascicles (bundles of axons) and receives identical routes (but different target incoming axons). This allows parameterized chip compiler variants (number of cores, neurons and axons per core, STDP or NO-STDP, etc.) that can be generated on the fly.

FIG. 16 illustrates the multiple levels of structural plasticity that can be obtained using functional neural core circuits 600 (FIG. 4), in accordance with an embodiment of the invention. The functional neural core circuit 600 is a canonical learning mechanism that works at all levels of a neural network. Functional neural core circuits 600 may be used to introduce multiple levels of structural plasticity. For example, a set 240 (FIG. 18) of functional neural core circuits 600 may be configured to represent any one of the following: an axon-to-dendrite connectivity, a dendrite-to-soma connectivity, a soma-to-soma connectivity, and a soma-to-axon connectivity.

A set 240 (FIG. 18) of functional neural core circuits 600 representing axon-to-dendrite connectivity can be connected via inter-core connectivity to a set 240 of functional neural core circuits 600 representing dendrite-to-soma connectivity. A set 240 of functional neural core circuits 600 representing dendrite-to-soma connectivity can be connected via inter-core connectivity to a set 240 of functional neural core circuits 600 representing soma-to-soma connectivity. A set 240 of functional neural core circuits 600 representing soma-to-soma connectivity can be connected via inter-core connectivity to a set 240 of functional neural core circuits 600 representing soma-to-axon connectivity. A set 240 of functional neural core circuits 600 representing soma-to-axon connectivity can be connected via inter-core connectivity to a set 240 of functional neural core circuits 600 representing axon-to-dendrite connectivity.

Figure 17A:
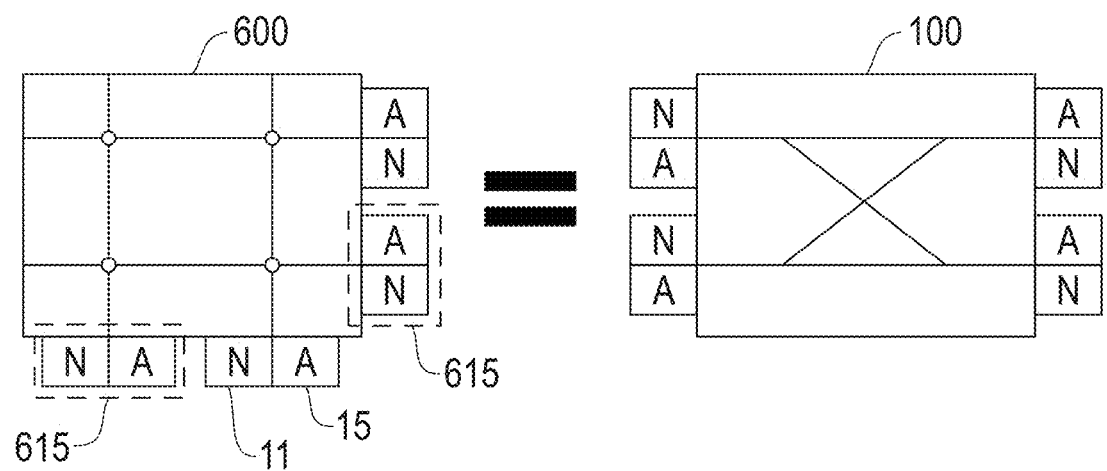
FIG. 17A illustrates a connectivity neural core circuit, in accordance with an embodiment of the invention.

FIG. 17A illustrates a connectivity neural core circuit 100, in accordance with an embodiment of the invention. A functional neural core circuit 600 comprising N neurons 11 and N incoming axons 15 has N! (N factorial) permutations for interconnecting the neurons 11 and the incoming axons 15. The functional neural core circuit 600 may be structured into a connectivity neural core circuit 100. Specifically, a connectivity neural core circuit 100 is obtained by restricting intra-core synaptic interconnections in a functional neural core circuit 600 to obtain a permutation matrix between incoming axons 15 and neurons 11.

The connectivity neural core circuit 100 is an adaptive, two-way crossbar switch. By structuring the functional neural core circuit 600 into a connectivity neural core circuit 100, intra-core synaptic plasticity in the functional neural core circuit 600 is transformed into inter-core routing plasticity. The learning rule applied to the connectivity neural core circuit 100 is the same as the learning rule applied to the functional neural core circuit 600 from which the connectivity neural core circuit 100 is structured from.

FIG. 17B illustrates the multiple levels of structural plasticity that can be obtained using functional neural core circuits 600 (FIG. 4) and connectivity neural core circuits 100 (FIG. 17A), in accordance with an embodiment of the invention.

A set 240 (FIG. 18) of functional neural core circuits 600 representing axon-to-dendrite connectivity can be connected via inter-core connectivity to a set 240 of functional neural core circuits 600 representing dendrite-to-soma connectivity. A set 240 of functional neural core circuits 600 representing dendrite-to-soma connectivity can be connected via inter-core connectivity to a set 240 of functional neural core circuits 600 representing soma-to-soma connectivity. A set 240 of functional neural core circuits 600 representing soma-to-soma connectivity can be connected via inter-core connectivity to a set 240 of functional neural core circuits 600 representing soma-to-axon connectivity. A set 240 of functional neural core circuits 600 representing soma-to-axon connectivity can be connected via inter-core connectivity to a set 240 of functional neural core circuits 600 representing axon-to-dendrite connectivity. Redirection layers function as intermediaries between the sets 240 of functional neural core circuits 600. Each redirection layer comprises a set 230 of connectivity neural core circuits 100.

Figure 18:
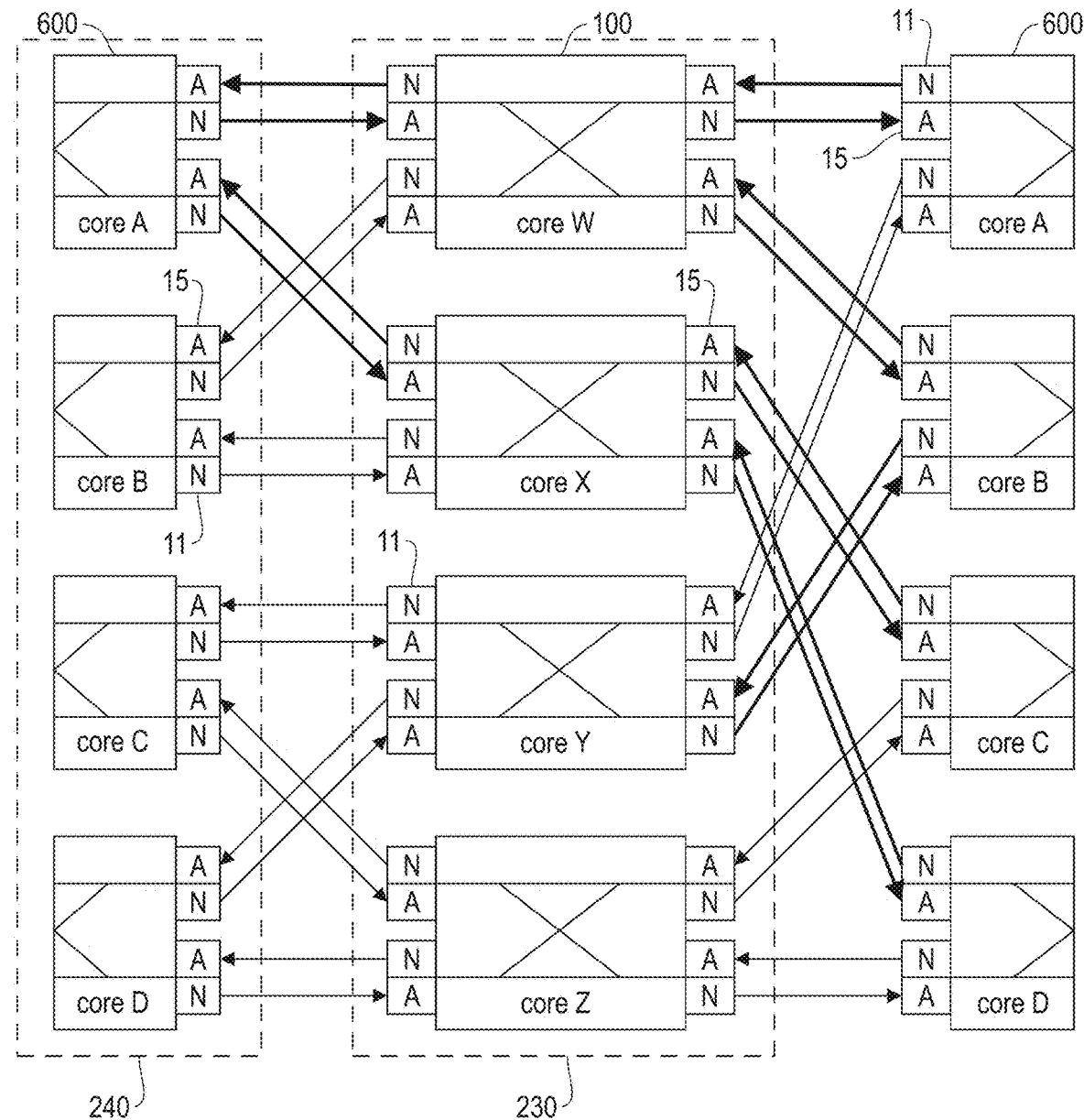
FIG. 18 illustrates an example Clos neural network, in accordance with an embodiment of the invention.

FIG. 18 illustrates an example Clos neural network 200, in accordance with an embodiment of the invention. The Clos neural network 200 comprises a set 240 of functional neural core circuits 600. The set 240 comprises multiple functional neural core circuits 600, such as core A, core B, core C, and core D. The Clos neural network 200 further comprises a set 230 of connectivity neural core circuits 100. The set 230 comprises multiple connectivity neural core circuits 100, such as core W, core X, core Y, and core Z.

In one example implementation, each functional neural core circuit 600 and each connectivity neural core circuit 100 comprises a 2×2 crossbar. Without the set 230, each functional neural core circuit 600 can communicate with at most two other functional neural core circuits 600. With the set 230, however, any functional neural core circuit 600 can communicate with any other functional neural core circuit 600 in the Clos neural network 200 via a connectivity neural core circuit 100. As shown in FIG. 18, a neuron 11 in core A, core B, core C, or core D can target an incoming axon 15 in core A, core B, core C, or core D using a connectivity neural core circuit 100 (i.e., core W, core X, core Y, or core Z) in the set 230.

Specifically, the set 230 interconnects outgoing axons 13 (FIG. 1A) of neurons 11 in the set 240 to incoming axons 15 in the set 240. For example, core W interconnects an outgoing axon 13 in core A or core B to an incoming axon 15 in core A or core B. At least one outgoing axon 13 in core A is configured to send output (e.g., firing events) to an incoming axon 15 in core W. At least one outgoing axon 13 in core B is configured to send output to an incoming axon 15 in core W. At least one outgoing axon 13 in core W is configured to send output to an incoming axon 15 in core A. At least one outgoing axon 13 in core W is configured to send output to an incoming axon 15 in core B.

Core X interconnects an outgoing axon 13 (FIG. 1A) in core A, core B, core C or core D to an incoming axon 15 in core A, core B, core C, or core D. At least one outgoing axon 13 in core A is configured to send output to an incoming axon 15 in core X. At least one outgoing axon 13 in core B is configured to send output to an incoming axon 15 in core X. At least one outgoing axon 13 in core C is configured to send output to an incoming axon 15 in core X. At least one outgoing axon 13 in core D is configured to send output to an incoming axon 15 in core X. At least one outgoing axon 13 in core X is configured to send output to an incoming axon 15 in core A. At least one outgoing axon 13 in core X is configured to send output to an incoming axon 15 in core B. At least one outgoing axon 13 in core X is configured to send output to an incoming axon 15 in core C. At least one outgoing axon 13 in core X is configured to send output to an incoming axon 15 in core D.

Core Y interconnects an outgoing axon 13 (FIG. 1A) in core A, core B, core C or core D to an incoming axon 15 in core A, core B, core C, or core D. At least one outgoing axon 13 in core A is configured to send output to an incoming axon 15 in core Y. At least one outgoing axon 13 in core B is configured to send output to an incoming axon 15 in core Y. At least one outgoing axon 13 in core C is configured to send output to an incoming axon 15 in core Y. At least one outgoing axon 13 in core D is configured to send output to an incoming axon 15 in core Y. At least one outgoing axon 13 in core Y is configured to send output to an incoming axon 15 in core A. At least one outgoing axon 13 in core Y is configured to send output to an incoming axon 15 in core B. At least one outgoing axon 13 in core Y is configured to send output to an incoming axon 15 in core C. At least one outgoing axon 13 in core Y is configured to send output to an incoming axon 15 in core D.

Core Z interconnects an outgoing axon 13 (FIG. 1A) in core C or core D to an incoming axon 15 in core C or core D. At least one outgoing axon 13 in core C is configured to send output to an incoming axon 15 in core Z. At least one outgoing axon 13 in core D is configured to send output to an incoming axon 15 in core Z. At least one outgoing axon 13 in core Z is configured to send output to an incoming axon 15 in core C. At least one outgoing axon 13 in core Z is configured to send output to an incoming axon 15 in core D.

The set 230 of connectivity neural core circuits 100 provide structural plasticity, enabling each functional neural core circuit 600 in the Clos neural network 200 to adaptively discover a functional neural core circuit 600 it should connect. Neurons 11 in the Clos neural network 200 can discover which functional neural core circuits 600 to connect to, thereby enabling a physically-intelligent, fully self-configuring, adapting, universal fabric that extracts order from the environment.

A Clos neural network is highly scalable. A Clos neural network may comprise zero or more sets 230 of connectivity neural core circuits 100. Referring back to FIG. 18, the Clos neural network 200 may further comprise additional sets set 230 of connectivity neural core circuits 100, thereby allowing any neuron 11 the Clos neural network 200 to target any incoming axon 15 the Clos neural network 200. In one example implementation, each connectivity neural core circuit 100 provides a fanout of 256 targets. Accordingly, two sets 230 of connectivity neural core circuits 100 provide a fanout of about 64,000 targets, three sets 230 of connectivity neural core circuits 100 provide a fanout of about 16 million targets, and four sets 230 of connectivity neural core circuits 100 provide a fanout of about 4 billion targets.

Figure 19A:
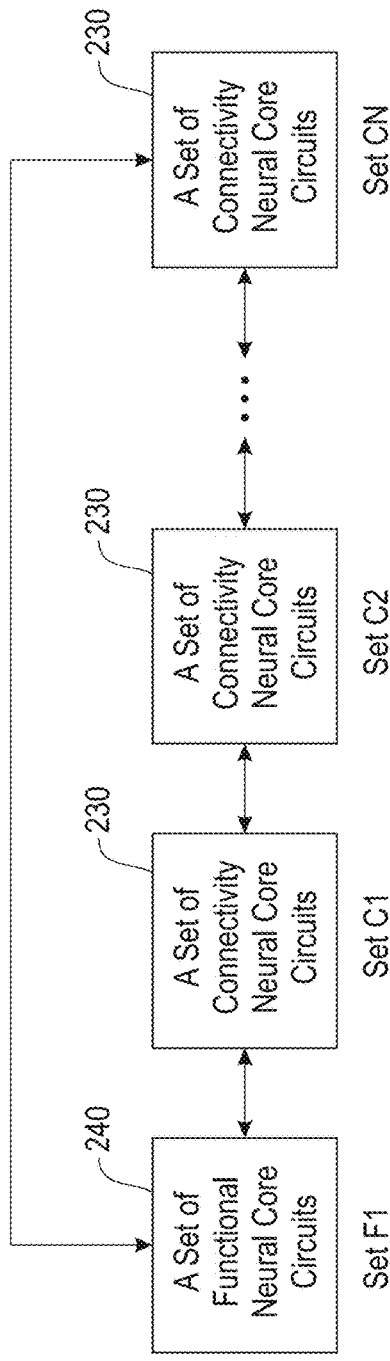
FIG. 19A illustrates a block diagram of an example Clos neural network wherein outgoing axons of a set of functional neural core circuits are interconnected to incoming axons of the set of functional neural core circuits, in accordance with an embodiment of the invention.

FIG. 19A is a block diagram showing an example Clos neural network 250 wherein outgoing axons 13 (FIG. 1A) in a set 240 of functional neural core circuits 600 (FIG. 18) are interconnected to incoming axons 15 (FIG. 1A) in the set 240, in accordance with an embodiment of the invention. The Clos neural network 250 comprises a set 240 of functional neural core circuits 600, such as Set F1. The Clos neural network 250 further comprises zero or more sets 230 of connectivity neural core circuits 100 (FIG. 18), such as Sets C1, C2, . . . , CN.

The Clos neural network 250 enables the bidirectional flow of information. The zero or more sets 230 interconnect outgoing axons 13 (FIG. 1A) in the set 240 to incoming axons 15 (FIG. 1A) in the set 240. Specifically, outgoing axons 13 in each functional neural core circuit 600 (FIG. 18) in the set 240 (Set F1) send output to incoming axons 15 in said functional neural core circuit 600 or a different functional neural core circuit 600 in the set 240 via the zero or more sets 230. Incoming axons 15 in each functional neural core circuit 600 in the set 240 (Set F1) receive output from outgoing axons 13 in said functional neural core circuit 600 or a different functional neural core circuit 600 in the set 240 via the zero or more sets 230.

At least one outgoing axon 13 and at least one incoming axon 15 in the set 240 (Set F1) is connected to an incoming axon 15 and an outgoing axon 13, respectively, in a first set 230 (Set C1), if any. For example, some outgoing axons 13 in Set F1 send output to some incoming axons 15 in Set C1, and some incoming axons 15 in Set F1 receive output from some outgoing axons 13 in Set C1. At least one outgoing axon 13 and at least one incoming axon 15 in the set 240 (Set F1) is connected to an incoming axon 15 and an outgoing axon 15, respectively, in a last set 230 (Set CN), if any. For example, some outgoing axons 13 in Set F1 send output to some incoming axons 15 in Set CN, and some incoming axons 15 in Set F1 receive output from some outgoing axons 13 in Set CN. At least one outgoing axon 13 and at least one incoming axon 15 in each set 230 is connected to an incoming axon 15 and an outgoing axon 13, respectively, in a next set 230, if any. At least one outgoing axon 13 and at least one incoming axon 15 in each set 230 is connected to an incoming axon 15 and an outgoing axon 13, respectively, in a previous set 230, if any. For example, some outgoing axons 13 in Set C1 send output to some incoming axons 15 in Set C2, and some incoming axons 15 in Set C1 receive output from some outgoing axons 13 in Set C2.

As such, each functional neural core circuit 600 (FIG. 18) in the set 240 may communicate with itself or another functional neural core circuit 600 in the set 240 using the sets 230, if any.

Figure 19B:
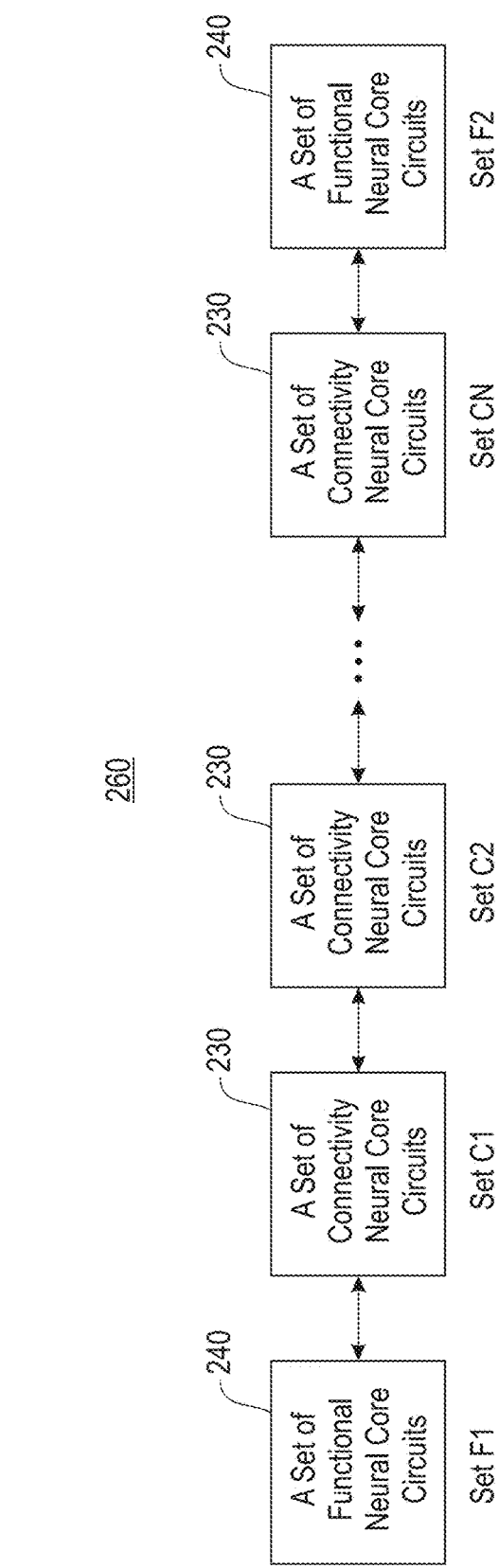
FIG. 19B illustrates a block diagram of an example Clos neural network wherein a first set of functional neural core circuits is interconnected to a second set of functional neural core circuits, in accordance with an embodiment of the invention.

FIG. 19B is a block diagram showing an example Clos neural network 260, wherein a first set 240 of functional neural core circuits 600 (FIG. 18) is interconnected to a second set 240 of functional neural core circuits 600, in accordance with an embodiment of the invention. The Clos neural network 260 comprises a first and a second set 240 of functional neural core circuits 600, such as Sets F1 and F2. The Clos neural network 260 further comprises zero or more sets 230 of connectivity neural core circuits 100 (FIG. 18), such as Sets C1, C2, . . . , CN.

The Clos neural network 260 enables bidirectional flow of information. The zero or more sets 230 interconnect outgoing axons 13 (FIG. 1A) and incoming axons 15 (FIG. 1A) in the first set 240 to incoming axons 15 and outgoing axons 13 in the second set 240, respectively. Specifically, outgoing axons 13 in each functional neural core circuit 600 (FIG. 18) in the first set 240 (Set F1) send output to incoming axons 15 in a functional neural core circuit 600 in the second set 240 (Set F2) via the zero or more sets 230. Outgoing axons 13 in each functional neural core circuit 600 in the second set 240 (Set F2) send output to incoming axons 15 in a functional neural core circuit 600 in the first set 240 (Set F1) via the zero or more sets 230. Incoming axons 15 in each functional neural core circuit 600 in the first set 240 (Set F1) receive output from outgoing axons 13 in a functional neural core circuit 600 in the second set 240 (Set F2) via the zero or more sets 230. Incoming axons 15 in each functional neural core circuit 600 in the second set 240 (Set F2) receive output from outgoing axons 13 in a functional neural core circuit 600 in the first set 240 (Set F1) via the zero or more sets 230.

Each one outgoing axon 13 and each incoming axon 15 in the first set 240 (Set F1) is connected to an incoming axon 15 and an outgoing axon 13, respectively, in a first set 230 (Set C1), if any. For example, each outgoing axon 13 in Set F1 sends output to an incoming axon 15 in Set C1, and each incoming axon 15 in Set F1 receives output from an outgoing axon 13 in Set C1. At least one outgoing axon 13 and at least one incoming axon 15 in each set 230 is connected to an incoming axon 15 and an outgoing axon 13, respectively, in a next set 230, if any. At least one outgoing axon 13 and at least one incoming axon 15 in each set 230 is connected to an incoming axon 15 and an outgoing axon 13, respectively, in a previous set 230, if any. For example, some outgoing axons 13 in Set C1 send output to some incoming axons 15 in Set C2, and some incoming axons 15 in Set C1 receive output from some outgoing axons 13 in Set C2. Each one outgoing axon 13 and each incoming axon 15 in the second set 240 (Set F2) is connected to an incoming axon 15 and an outgoing axon 13, respectively, in a last set 230 (Set CN), if any. For example, each outgoing axon 13 in Set F2 sends output to an incoming axon 15 in Set CN, and each incoming axon 15 in Set F2 receives output from an outgoing axon 13 in Set CN.

As such, each functional neural core circuit 600 in the first set 240 may communicate with a functional neural core circuit 600 in the second set 240 using the sets 230, if any.

Figure 19C:
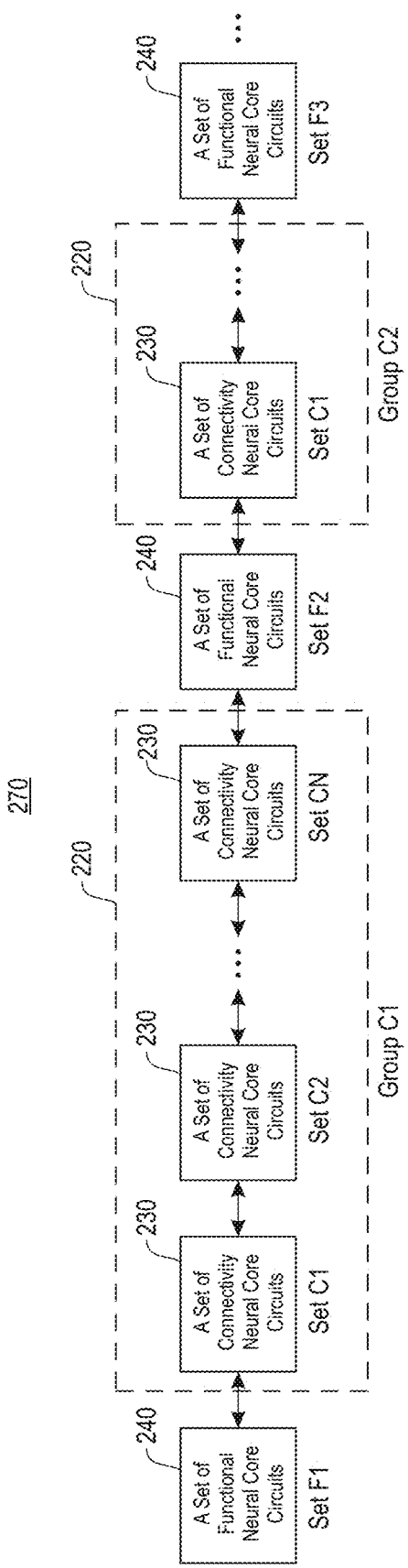
FIG. 19C illustrates a block diagram of an example Clos neural network wherein multiple sets of functional neural core circuits are interconnected via multiple groups of connectivity neural core circuits, in accordance with an embodiment of the invention.

FIG. 19C is a block diagram showing an example Clos neural network 270 wherein multiple sets 240 of functional neural core circuits are interconnected via multiple groups 220 of connectivity neural core circuits, in accordance with an embodiment of the invention. The Clos neural network 270 comprises multiple sets 240 of functional neural core circuits 600 (FIG. 18), such as Sets F1, F2, and F3. The Clos neural network 270 further comprises multiple groups 220 of connectivity neural core circuits 100 (FIG. 18), such as Groups C1 and C2. Each group 220 comprises zero or more sets 230 of connectivity core circuits 100, such as Sets C1, C2, ..., CN.

The Clos neural network 270 enables bidirectional flow of information. Each group 220 interconnects outgoing axons 13 (FIG. 1A) and incoming axons 15 (FIG. 1A) in one set 240 of functional neural core circuits 600 to incoming axons 15 and outgoing axons 13 in another set 240 of functional neural core circuits 600, respectively. As such, outgoing axons 13 in each functional neural core circuit 600 (FIG. 18) in one set 240 send output to incoming axons 15 in a functional neural core circuit 600 in another set 240 via the groups 220. Incoming axons 15 in each functional neural core circuit 600 in one set 240 receive output from outgoing axons 13 in a functional neural core circuit 600 in another second set 240 via the groups 220.

For each group 220, at least one outgoing axon 13 and at least one incoming axon 15 in a first set 230, if any, in said group 220 is connected to an incoming axon 15 and an outgoing axon 13, respectively, in a first set 240 of functional neural core circuits 600. For each set 230 in said group 220, at least one outgoing axon 13 and at least one incoming axon 15 in said set 230 is connected to an incoming axon 15 and an outgoing axon 15, respectively, in a next set 230, if any, in said group. For each set 230 in said group 220, at least one outgoing axon 13 and at least one incoming axon 15 in said set 230 is connected to an incoming axon 15 and an outgoing axon 13, respectively, in a previous set 230, if any, in said group 220. At least one outgoing axon 13 and at least one incoming axon 15 in a last set 230, if any, in said group 220 is connected to an incoming axon 15 and an outgoing axon 13, respectively, in a second set 240 of functional neural core circuits.

As such, each functional neural core circuit 600 in one set 240 may communicate with a functional neural core circuit 600 in another set 240 using the groups 220.

Figure 19D:
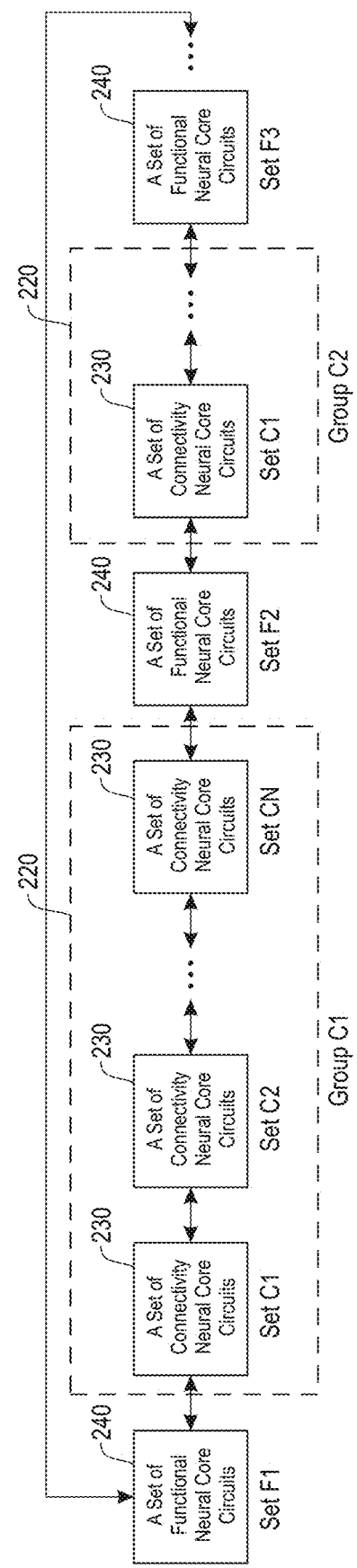
FIG. 19D illustrates a block diagram of an example Clos neural network wherein outgoing axons in each set of functional neural core circuits are interconnected to incoming axons said set of functional neural core circuits via multiple groups of connectivity neural core circuits, in accordance with an embodiment of the invention.

FIG. 19D is a block diagram showing an example Clos neural network 280 wherein outgoing axons 13 in each set 240 of functional neural core circuits 240 are interconnected to incoming axons 15 of said set 240 via multiple groups 220 of connectivity neural core circuits, in accordance with an embodiment of the invention. The Clos neural network 280 is similar to the Clos neural network 270 in FIG. 19C, with the exception that the multiple groups 220 in FIG. 19D also interconnects outgoing axons 13 in each set 240 of functional neural core circuits 600 to incoming axons 15 in said set 240. As such, each functional neural core circuit 600 in the first set 240 may communicate with itself or another functional neural core circuit 600 in the first set 240 using the groups 220.

Figure 19E:
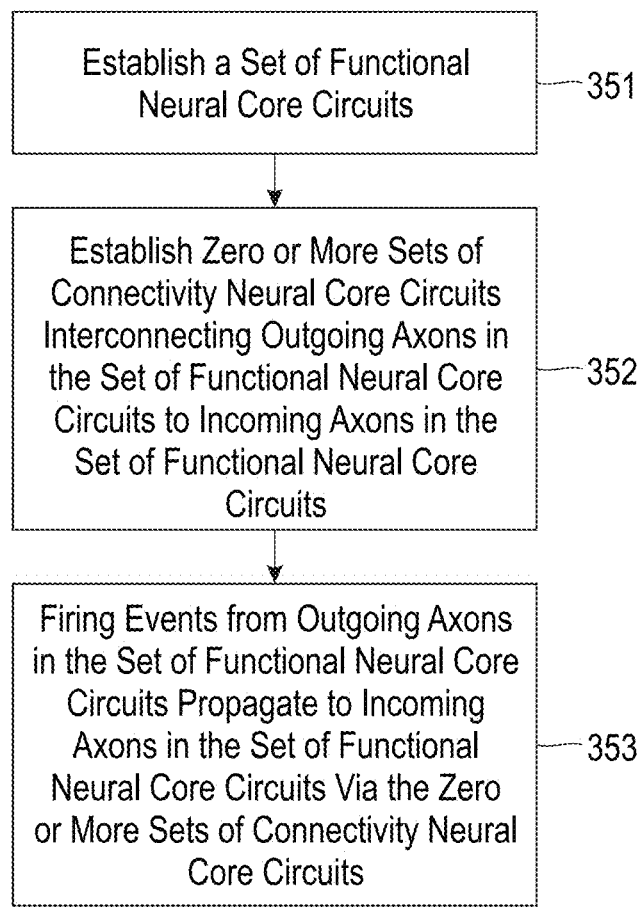
FIG. 19E illustrates a flowchart of an example process for the Clos neural network in FIG. 19A, in accordance with an embodiment of the invention.

FIG. 19E illustrates a flowchart of an example process 350 for the Clos neural network 250 in FIG. 19A, in accordance with an embodiment of the invention. In process block 351, establish a set 240 of functional neural core circuits 600. In process block 352, establish zero or more sets 230 of connectivity neural core circuits 100 interconnecting outgoing axons 13 in the set 240 to incoming axons 15 in the set 240. In process block 353, firing events from outgoing axons 13 in the set 240 propagate to incoming axons 15 in the set 240 via the zero or more sets 230.

Figure 19F:
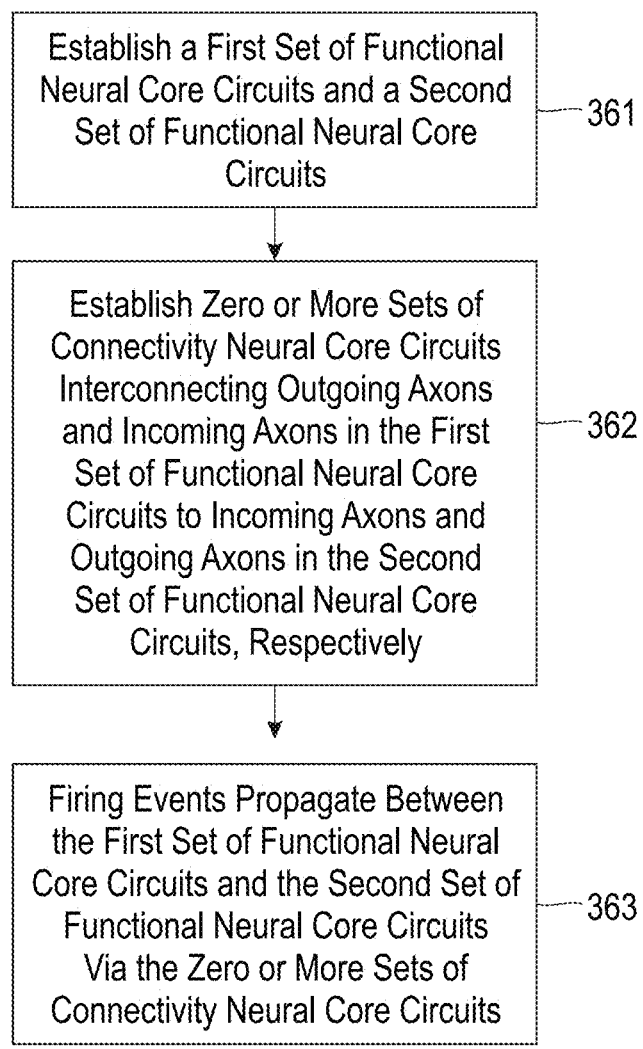
FIG. 19F illustrates a flowchart of an example process for the Clos neural network in FIG. 19B, in accordance with an embodiment of the invention.

FIG. 19F illustrates a flowchart of an example process 360 for the Clos neural network 260 in FIG. 19B, in accordance with an embodiment of the invention. In process block 361, establish a first and a second set 240 of functional neural core circuits 600. In process block 362, establish zero or more sets 230 of connectivity neural core circuits 100 interconnecting outgoing axons 13 and incoming axons 15 in the first set 240 to incoming axons 15 and outgoing axons 13 in the second set 240, respectively. In process block 363, firing events propagate between the first set 240 and the second set 240 via the zero or more sets 230.

Figure 19G:
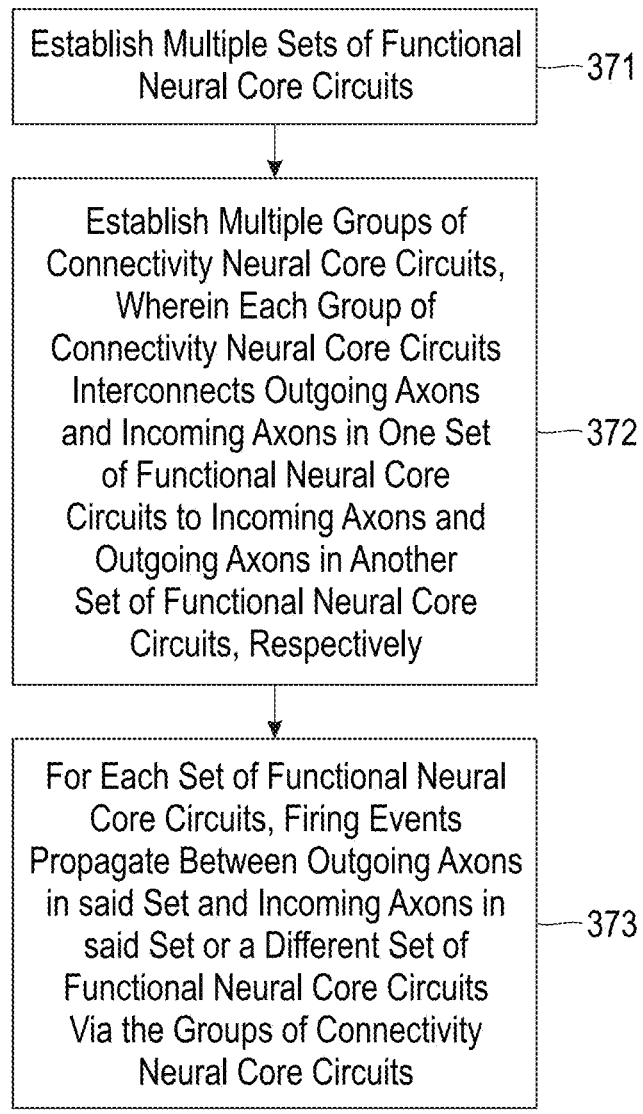
FIG. 19G illustrates a flowchart of an example process for the Clos neural network in FIG. 19D, in accordance with an embodiment of the invention.

FIG. 19G illustrates a flowchart of an example process 370 for the Clos neural network 280 in FIG. 19D, in accordance with an embodiment of the invention. In process block 371, establish multiple sets 240 of functional neural core circuits 600. In process block 372, establish multiple groups 220 of connectivity neural core circuits 100, wherein each group 220 interconnects outgoing axons 13 and incoming axons 15 in one set 240 to incoming axons 15 and outgoing axons 13 in another set 240, respectively. In process block 373, for each set 240, firing events propagate between outgoing axons 13 in said set 240 and incoming axons 15 in said set 240 or another set 240 via the groups 220.

Figure 20A:
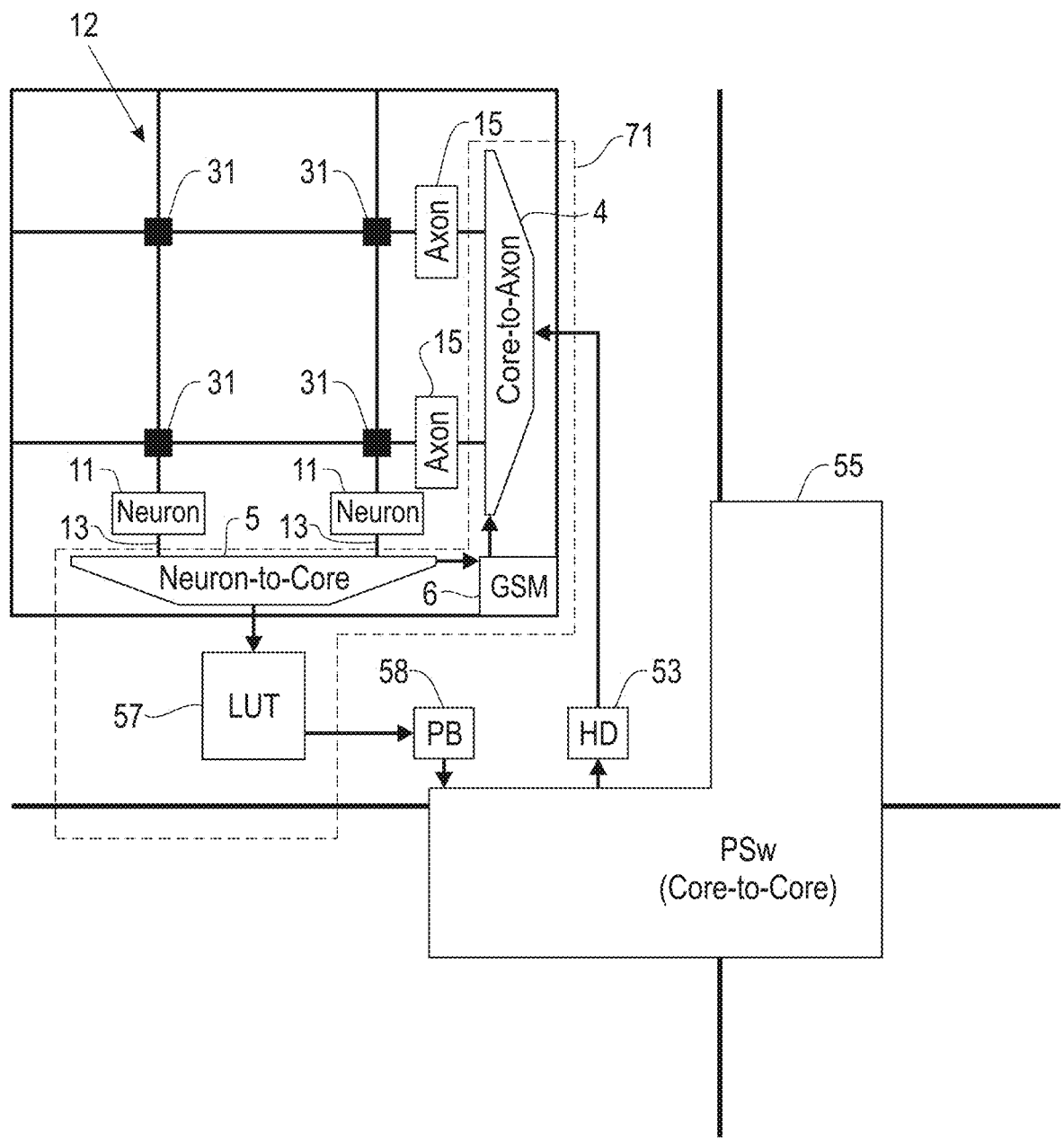
FIG. 20A illustrates a routing module of a core module, in accordance with an embodiment of the invention.
Figure 20B:
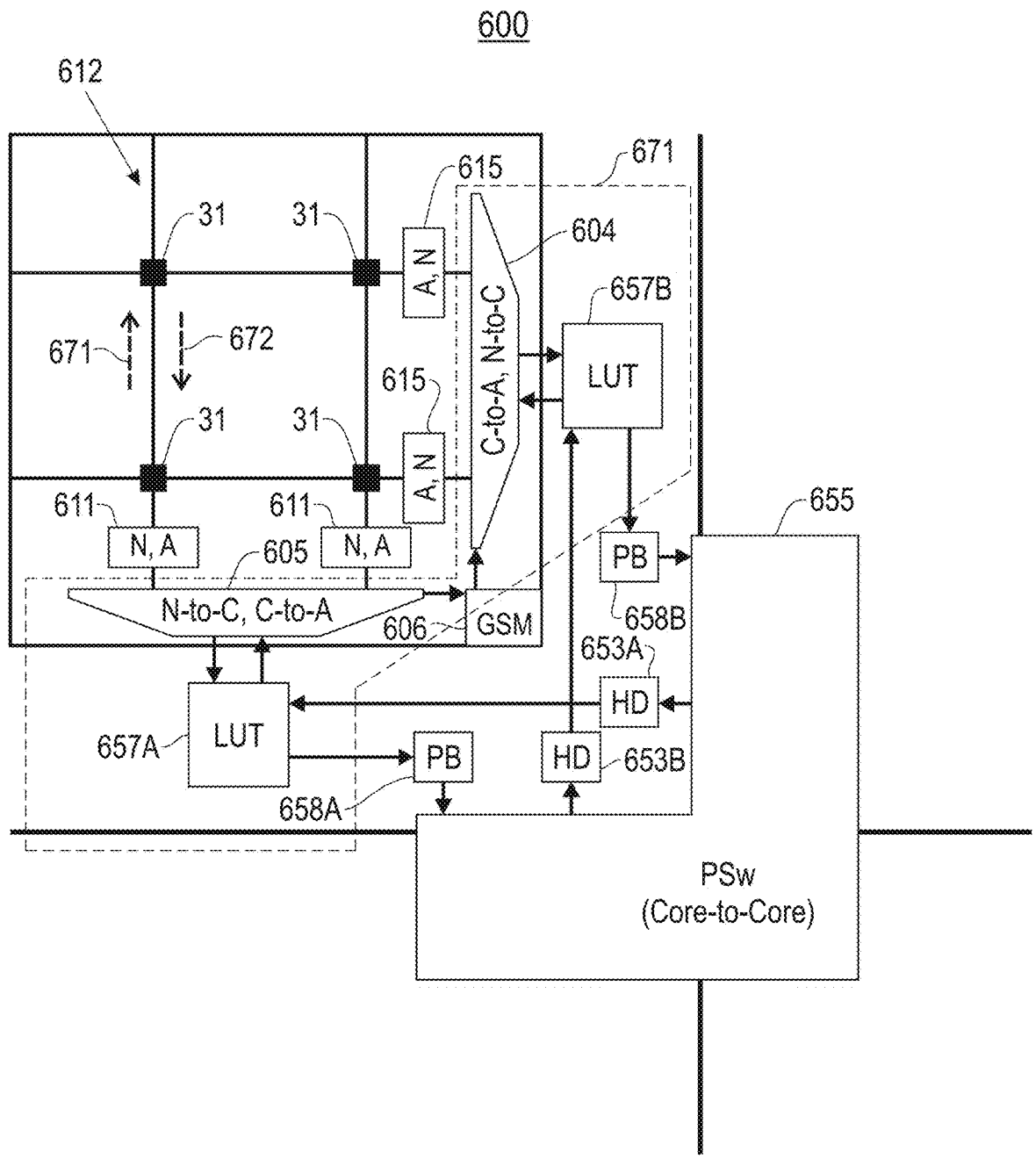
FIG. 20B illustrates a routing module of a functional neural core circuit, in accordance with an embodiment of the invention.
Figure 20C:
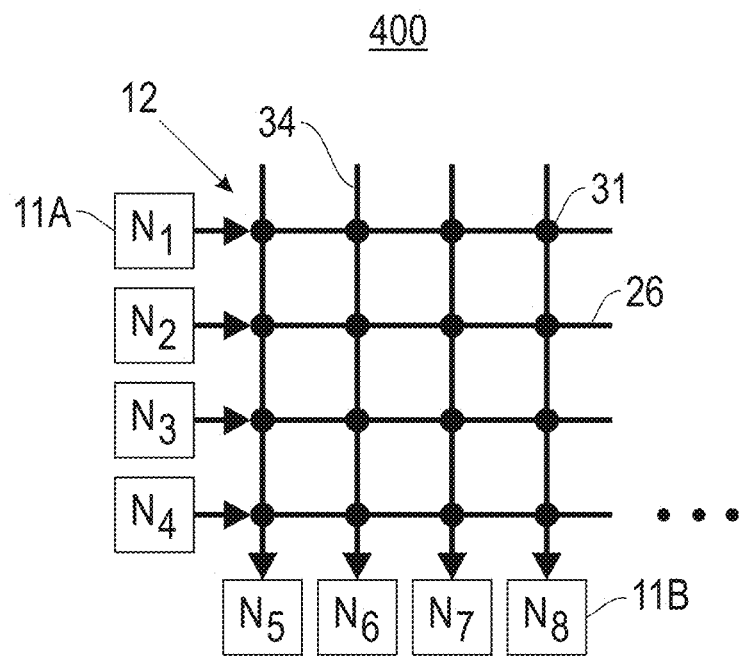
FIG. 20C illustrates a standard core, in accordance with an embodiment of the invention.
Figure 20D:
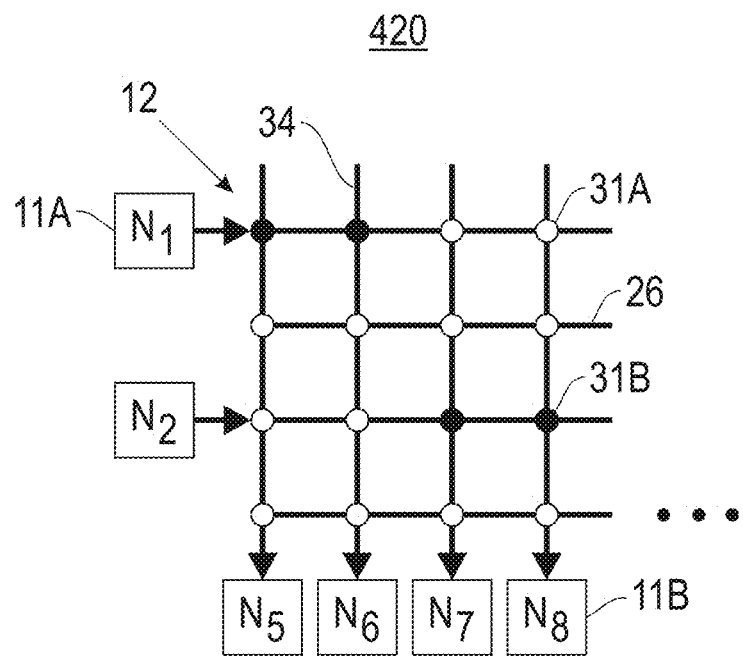
FIG. 20D illustrates a splitter core, in accordance with an embodiment of the invention.
Figure 20E:
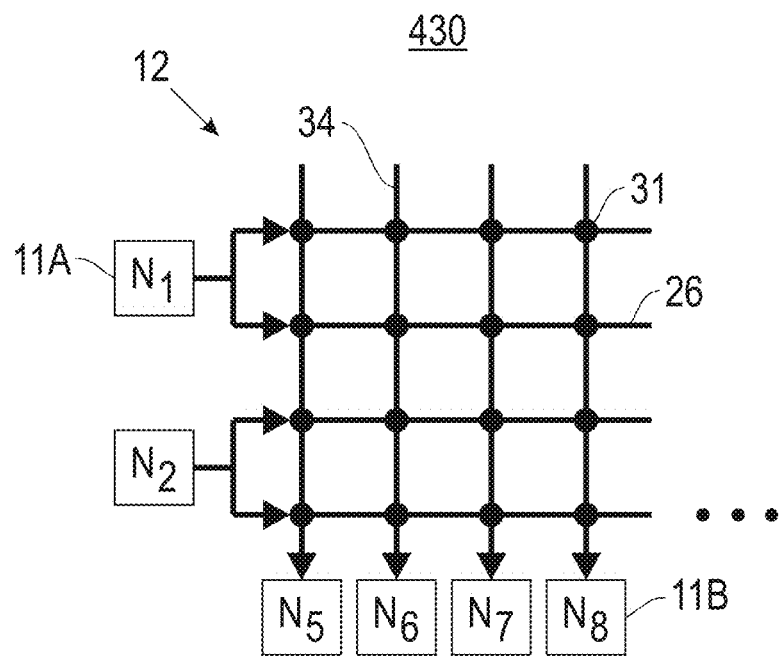
FIG. 20E illustrates a simulated multi-bit synapse core, in accordance with an embodiment of the invention.
Figure 20F:
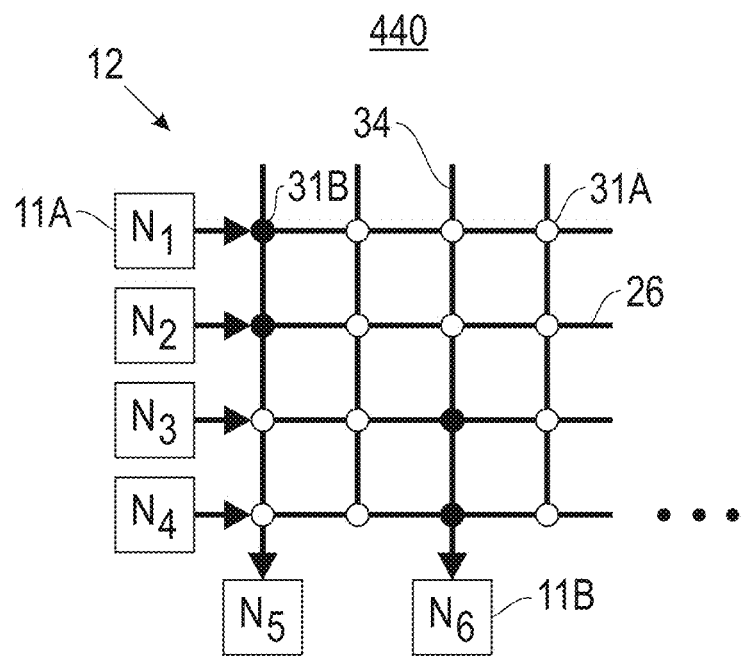
FIG. 20F illustrates a merger core, in accordance with an embodiment of the invention.
Figure 20G:
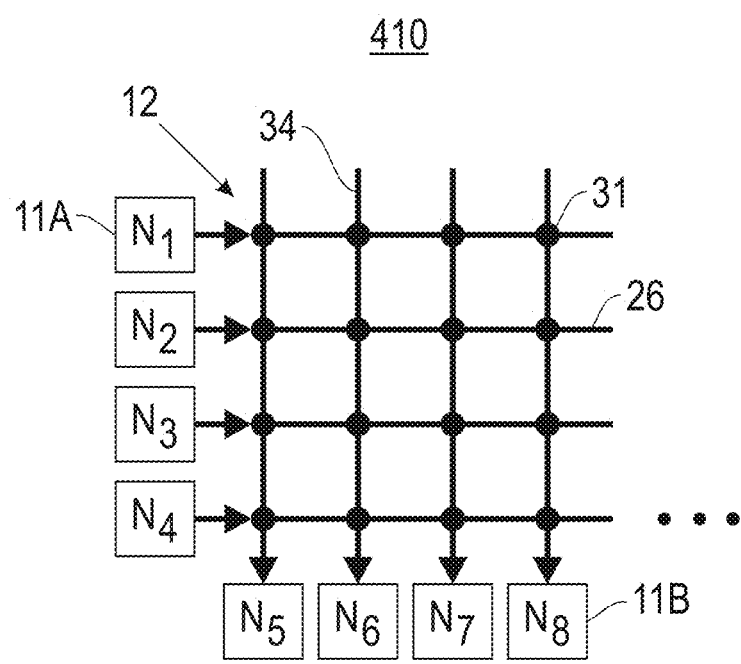
FIG. 20G illustrates a random core, in accordance with an embodiment of the invention.

The lookup table(s), neuron parameters, and synapse parameters of a functional neural core circuit 600 (FIG. 4) or a core module 10 (FIG. 1A) can be configured to transform the functional neural core circuit 600 or the core module 10 into one of the following five neural core types: a standard neural core circuit ("standard core") 400 (FIG. 20C), a splitter neural core circuit ("splitter core") 420 (FIG. 20D), a simulated multi-bit synapse neural core circuit ("simulated multi-bit synapse core") 430 (FIG. 20E), a merger neural core circuit ("merger core") 440 (FIG. 20F), or a random core 410 (FIG. 20G). These five neural core types represent different parameterizations of a functional neural core circuit 600 or a core module 10.

Each neural core type is a neural core circuit (e.g., a functional neural core circuit 600, a core module 10) including a synaptic interconnect network 12 (FIG. 20C) having plural electronic synapses 31 (FIG. 20C) for interconnecting one or more source electronic neurons ("source neurons") 11A (FIG. 20C) with one or more target electronic neurons ("target neurons") 11B (FIG. 20C). The interconnect network 12 further includes multiple axon paths 26 (FIG. 20C) and multiple dendrite paths 34. Each synapse 31 is at a cross-point junction of the interconnect network 12 between a dendrite path 34 and an axon path 26. Each synapse 31 provides a configurable level of signal conduction from an axon path 26 of a source neuron 11A to a dendrite path of a target neuron 11B. Each synapse 31 is either a conducting synapse (i.e., in a fully conducting state) 31B (FIG. 20D) or a non-conducting synapse (i.e., in a non-conducting state) 31A (FIG. 20D).

Further, each axon path 26 includes two or more bits of information designating an axon path type. For each neuron 11, the operational parameters of said neuron 11 includes a strength parameter for each axon path type. A target neuron 11B responds to a spike received from an axon path 26 based on a strength parameter for the axon path type of the axon path 26.

A routing module maintaining routing information routes output from a source neuron 11A (FIG. 20C) to one or more selected axon paths 26 (FIG. 20C) in the interconnect network 12. The output of the source neurons 11A is a binary signal consisting of spikes and non-spikes. Each target neuron 11B receives input from one or more selected dendrite paths 34 (FIG. 20C). For each target neuron 11B, the input received is a binary signal comprising of spikes and non-spikes.

FIG. 20A illustrates a routing module 71 of a core module 10, in accordance with an embodiment of the invention. The routing module 71 includes the LUT 57, the address-event receiver (Core-to-Axon) 4, and the address-event transmitter (Neuron-to-Core) 5. As described above, the LUT 57 includes routing information. The routing module 71 utilizes this routing information to route output from a source neuron 11A to to one or more selected axon paths 26. The address-event receiver 4 transmits output from source neurons 11A to selected axon paths 26. The address-event transmitter 5 transmits output generated by the source neurons 11A to the core modules 10 including the selected axon paths 26.

FIG. 20B illustrates a routing module 671 of a functional neural core circuit 600, in accordance with an embodiment of the invention. The routing module 671 includes the LUTs 657A and 657B, and the address-event transmitter-receivers 605 and 604. As described above, each LUT 657A and 657B includes routing information. The routing module 671 utilizes this routing information to route output from a source neuron 11A to to one or more selected axon paths 26. The address-event transmitter-receivers 605 and 604 transmit output to selected axon paths 26. The address-event transmitter-receivers 605 and 604 also transmit output generated by the source neurons 11A to the functional neural core circuits 600 including the selected axon paths 26.

The five neural core types mentioned above are described in detail below.

FIG. 20C illustrates a standard core 400, in accordance with an embodiment of the invention. The standard core 400 includes multiple source neurons 11A and multiple target neurons 11B. For each source neuron 11A, output of said source neuron 11A is routed to an axon path 26 in the standard core 400. The output of each source neuron 11A in the standard core 400 is a binary signal consisting of spikes and non-spikes.

For each source neuron 11A, the axon path 26 of the said source neuron 11A includes synapses 31 that can be configured to provide any level of signal conduction. Each synapse 31 interconnecting a source neuron 11A to a target neuron 11B is either a conducting synapse 31B (FIG. 20D) or a non-conducting synapse 31A (FIG. 20D).

FIG. 20D illustrates a splitter core 420, in accordance with an embodiment of the invention. The splitter core 420 includes multiple source neurons 11A and multiple target neurons 11B. For each source neuron 11A, output of said source neuron 11A is routed to one or more axon paths 26 in the splitter core 420. The output of each source neuron 11A in the splitter core 420 is a binary signal consisting of spikes and non-spikes.

For each source neuron 11A, each axon path 26 of said source neuron 11A includes conducting synapses 31B with a set of dendrite paths 34, wherein each dendrite path 34 in the set of dendrite paths 34 has a conducting synapse 31B with only said axon path 26. Each synapse 31 interconnecting a source neuron 11A to a target neuron 11B is either a conducting synapse 31B or a non-conducting synapse 31A. Each target neuron 11B is configured to generate (i.e., emit) a spike each time it receives a spike from a source neuron 11A via a conducting synapse 31B.

FIG. 20E illustrates a simulated multi-bit synapse core 430, in accordance with an embodiment of the invention. The simulated multi-bit synapse core 430 includes multiple source neurons 11A and multiple target neurons 11B. The simulated multi-bit synapse core 430 allows each source neuron 11A to form multiple synaptic connections with each target neuron 11B. For each source neuron 11A, output of said source neuron 11A is routed to two or more axon paths 26 in the simulated multi-bit synapse core 430. The output of each source neuron 11A in the simulated multi-bit synapse core 430 is a binary signal consisting of spikes and non-spikes.

For each source neuron 11A, each axon path 26 of said source neuron 11A includes synapses 31 that can be configured to provide any level of signal conduction. Each synapse 31 interconnecting a source neuron 11A to a target neuron 11B is either a conducting synapse 31B or a non-conducting synapse 31A. The synaptic connection strength between a source neuron 11A and a target neuron 11B is equal to the sum of the signal conduction level from axon paths 26 of the source neuron 11A to dendrite paths 34 of the target neuron 11B.

FIG. 20F illustrates a merger core 440, in accordance with an embodiment of the invention. The merger core 440 includes multiple source neurons 11A and multiple target neurons 11B. The merger core 440 allows a target neuron 11B to combine output from multiple source neurons 11A. For each source neuron 11A, output of said source neuron 11A is routed to one or more axon paths 26 in the merger core 440. The output of each source neuron 11A in the merger core 440 is a binary signal consisting of spikes and non-spikes.

For each source neuron 11A, all axon paths 26 of said source neuron 11A include conducting synapses 31B with dendrite paths 34 of only one target neuron 11B. Each synapse 31 interconnecting a source neuron 11A to a target neuron 11B is either a conducting synapse 31B or a non-conducting synapse 31A.

FIG. 20G illustrates a random core 410, in accordance with an embodiment of the invention. The random core 410 includes multiple source neurons 11A and multiple target neurons 11B. For each source neuron 11A, output of said source neuron 11A is routed to one or more axon paths 26. The output of each source neuron 11A in the random core 410 is a binary signal consisting of spikes and non-spikes.

For each source neuron 11A, each axon path 26 of said source neuron 11A includes synapses 31 that can be configured to provide a random level of signal conduction. Each synapse 31 interconnecting a source neuron 11A to a target neuron 11B is randomly set to either a conducting synapse 31B or a non-conducting synapse 31A.

Figure 20H:
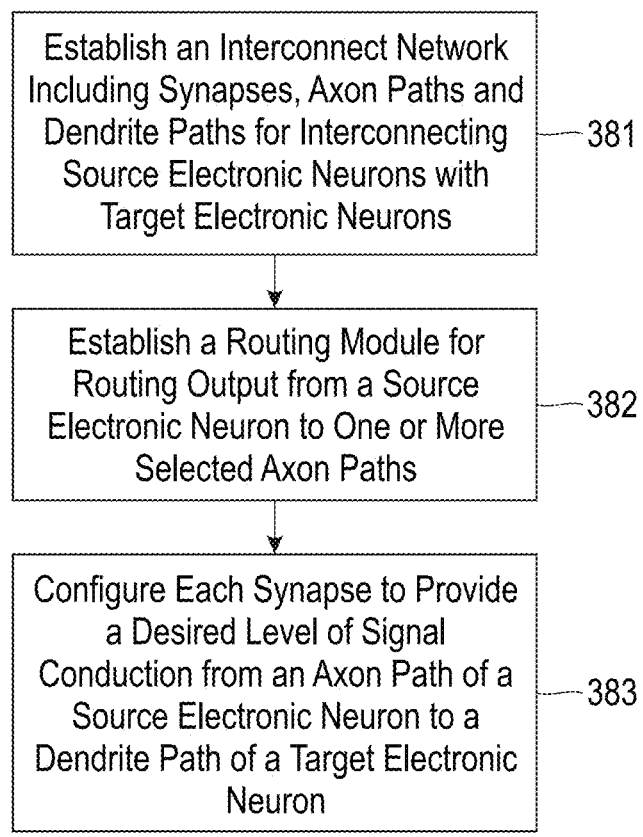
FIG. 20H illustrates a flowchart of an example process for a neural core circuit, in accordance with an embodiment of the invention.

FIG. 20H illustrates a flowchart of an example process 380 for a neural core circuit, in accordance with an embodiment of the invention. In process block 381, establish an interconnect network 12 including synapses 31, axon paths 26, and dendrite paths 34 for interconnecting source electronic neurons 11A with target electronic neurons 11B. In process block 382, establish a routing module for routing output from a source electronic neuron 11A to one or more selected axon paths 26. In process block 383, configure each synapse 31 to provide a desired level of signal conduction from an axon path 26 of a source electronic neuron 11A to a dendrite path 34 of a target electronic neuron 11B.

The five neural core types described above can be arranged into multi-core systems to produce different neural network architectures. For example, some of the neural core types described above can be arranged to form a multi-compartment neuron. Standard cores 400 or simulated multi-bit synapse cores 430 can be used to represent dendrite compartments of the multi-compartment neuron, and a merger core 440 can be used to represent a soma compartment of the multi-compartment neuron.

Figure 21A:
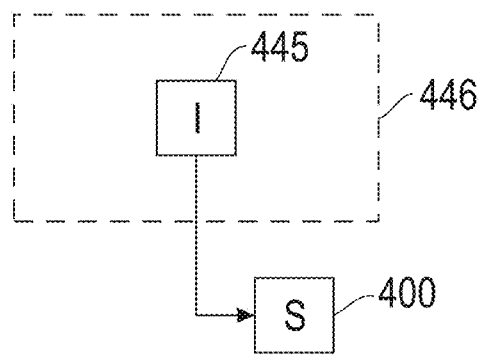
FIG. 21A illustrates a block diagram of an example multi-compartment neuron with a small receptive field, in accordance with an embodiment of the invention.

FIG. 21A is a block diagram of an example multi-compartment neuron 450 with a small receptive field, in accordance with an embodiment of the invention. The multi-compartment neuron 450 comprises a standard core 400 and an input block 445 comprising one or more inputs drawn from an input space 446. The number of inputs in the input block 445 is less than or equal to n, wherein n is the number of axon paths 26 (FIG. 20C) in the standard core 400. In one example implementation, the multi-compartment neuron 450 can collect up to 256 inputs.

All inputs in the input block 445 are directly connected to the standard core 400. Specifically, each input in the input block 445 is connected to an axon path 26 (FIG. 20C) in the standard core 400. Each synapse 31 in the standard core 400 has two distinct values, wherein each value denotes a synaptic state (i.e., fully conducting state or non-conducting state). The synaptic state of the synapses 31 (FIG. 20C) in the standard core 400 determines the selectivity of the target neurons 11B with respect to the inputs in the input block 445.

Figure 21B:
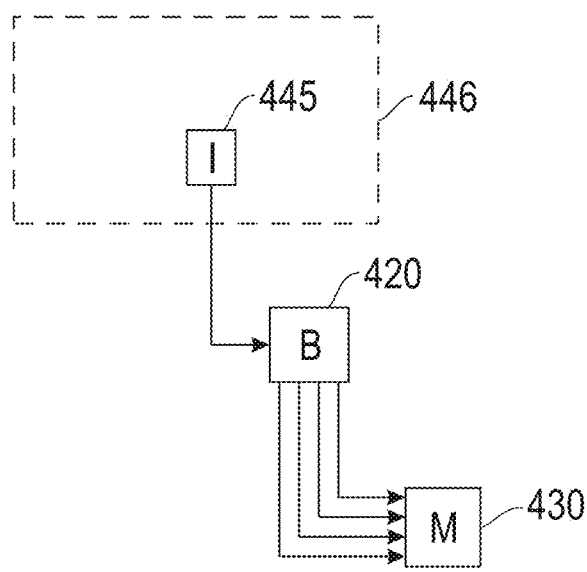
FIG. 21B is a block diagram of an example multi-bit synapse neuron representing a neuron with a small receptive field, wherein the multi-bit synapse neuron includes simulated multi-bit synapses, in accordance with an embodiment of the invention.

FIG. 21B is a block diagram of an example multi-bit synapse neuron 460 representing a neuron with a small receptive field, wherein the multi-bit synapse neuron 460 includes simulated multi-bit synapses, in accordance with an embodiment of the invention. The multi-bit synapse neuron 460 comprises a splitter core 420, a simulated multi-bit synapse core 430, and an input block 445 comprising one or more inputs drawn from an input space 446. The number of inputs in the input block 445 is less than or equal to n/i, wherein n is the number of axon paths 26 (FIG. 20D) in the simulated multi-bit synapse core 430, and i is the number of outputs that each input from an input block 445 is split into by the splitter core 420. In one example implementation, the multi-bit synapse neuron 460 can collect up to 128 inputs.

All inputs in the input block 445 are directly connected to the splitter core 420. Specifically, each input in the input block 445 is connected to an axon path 26 (FIG. 20D) in the splitter core 420. The splitter core 420 splits input from each input unit 445 into i outputs. The outputs of the splitter core 420 are directed to the simulated multi-bit synapse core 430.

Figure 21C:
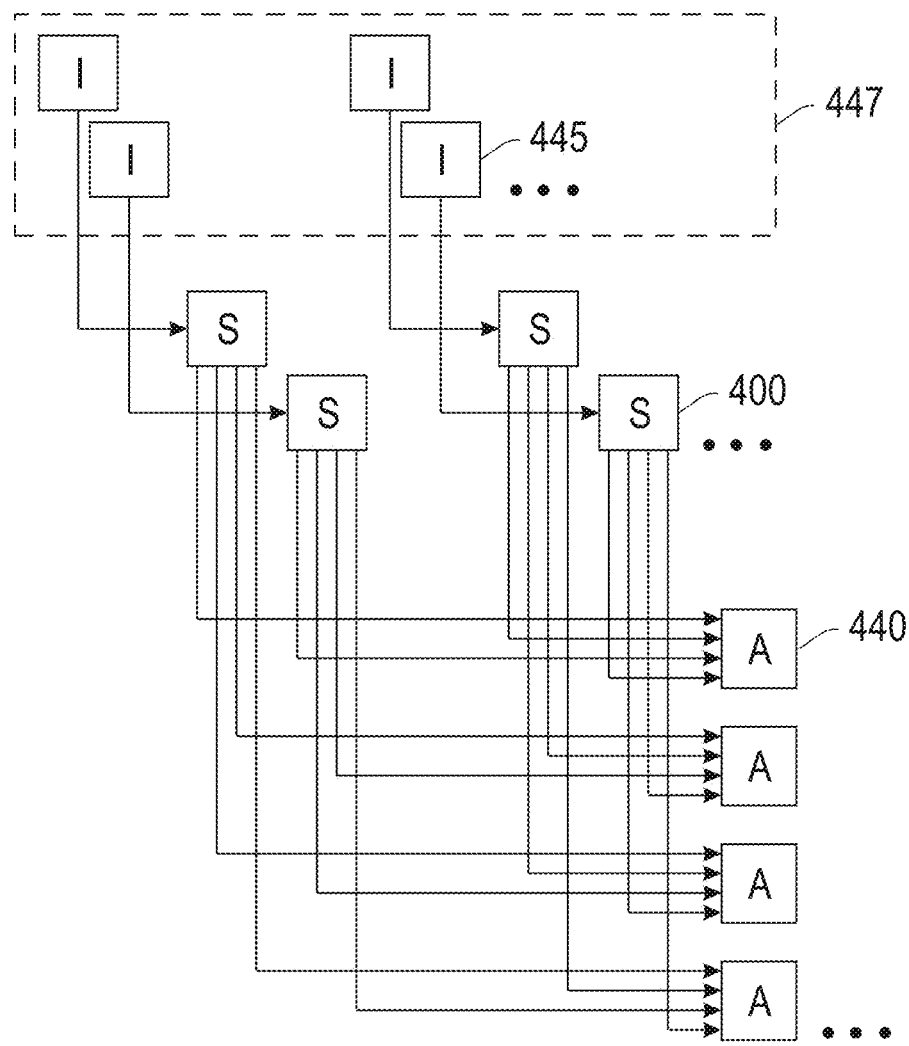
FIG. 21C illustrates a block diagram of an example multi-compartment neuron representing a neuron with a large receptive field, in accordance with an embodiment of the invention.

FIG. 21C is a block diagram of an example multi-compartment neuron 470 representing a neuron with a large receptive field, in accordance with an embodiment of the invention. The multi-compartment neuron 470 comprises multiple standard cores 400, multiple merger cores 440, and r input blocks 445, wherein each input block 445 comprises one or more inputs drawn from an input space 447, and wherein r is a positive integer. For example, as shown in FIG. 21C, r may be 4. The total number of inputs across all input blocks 445 in the input space 447 is less than or equal to m*n, wherein n is the number of axon paths 26 (FIG. 20C) in each standard core 400 and m is the number of axon paths 26 in each merger core 430.

Each input in an input block 445 is directly connected to a standard core 400. Each standard core 400 serves as a dendrite compartment of the multi-compartment neuron 470. For each standard core 400, output of up to m/r target neurons 11B in the standard core 400 is directed to a merger core 400. Each merger core 400 receives activity from n*r input blocks 445. In one example implementation, the multi-compartment neuron 470 can collect up to 65,536 inputs.

Figure 21D:
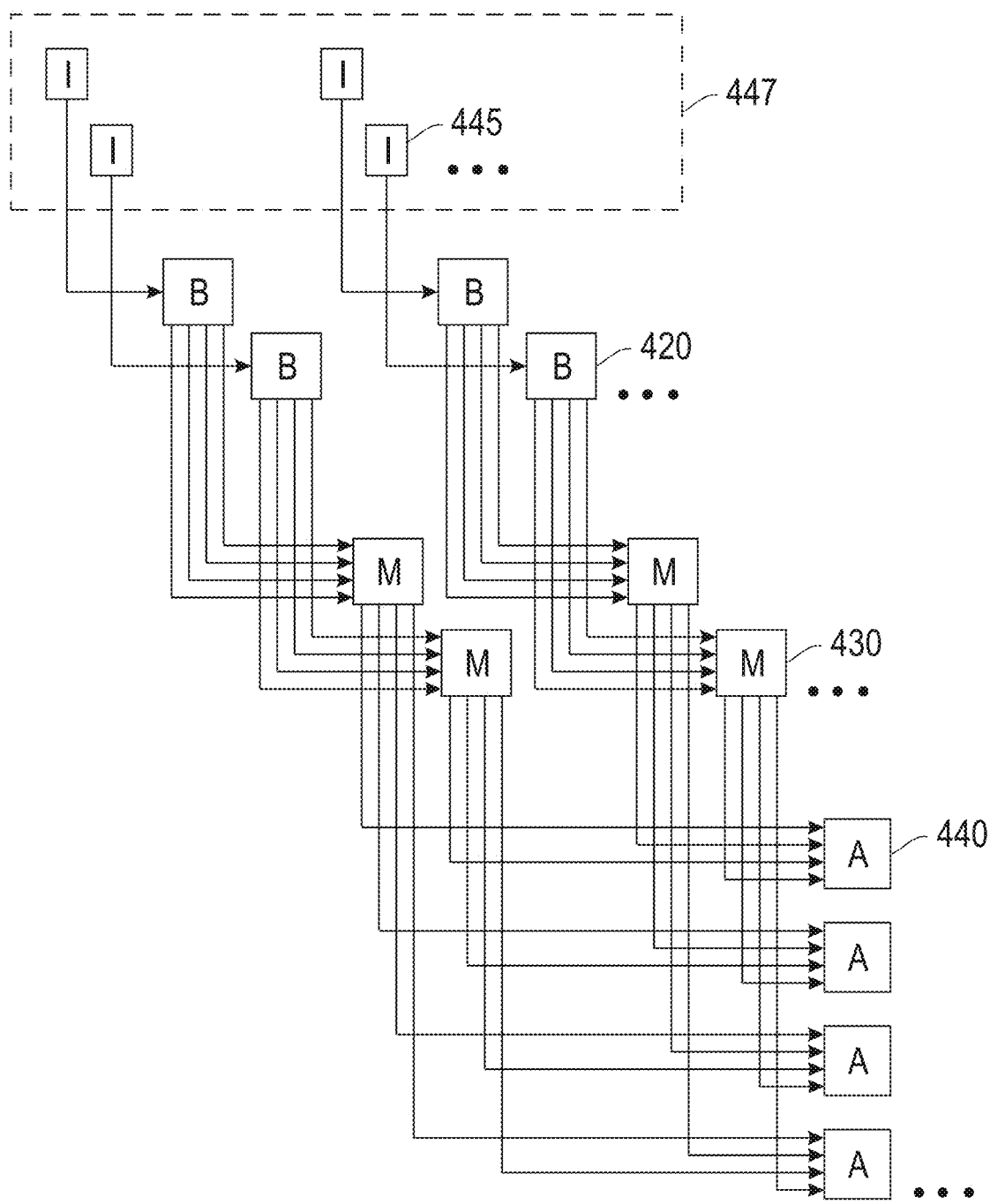
FIG. 21D illustrates a block diagram of an example multi-compartment neuron representing a neuron with a large receptive field, wherein the multi-compartment neuron includes simulated multi-bit synapses, in accordance with an embodiment of the invention.

FIG. 21D is a block diagram of an example multi-compartment neuron 480 representing a neuron with a large receptive field, wherein the multi-compartment neuron 480 includes simulated multi-bit synapses, in accordance with an embodiment of the invention. The multi-compartment neuron 480 comprises multiple splitter cores 420, multiple simulated multi-bit cores 430, multiple merger cores 440, and r input blocks 445, wherein each input block 445 comprises one or more inputs drawn from an input space 447, and wherein r is a positive integer. For example, as shown in FIG. 21D, r may be 4. The total number of inputs across all input blocks 445 in the input space 447 is less than or equal to m*n/i, wherein n is the number of axon paths 26 (FIG. 20D) in each simulated multi-bit synapse core 430, m is the number of axon paths 26 in each merger core 430, and i is the number of outputs that each input from an input block 445 is split into by a splitter core 420.

Each input in an input block 445 is directly connected to a splitter core 420. Each splitter core 420 splits input into i outputs. The outputs of each splitter core 420 are directed to a simulated multi-bit synapse core 430. Each simulated multi-bit synapse core 430 serves as a dendrite compartment of a multi-compartment neuron. For each simulated multi-bit synapse core 430, output of m/r target neurons 11B in the simulated multi-bit synapse core 430 are directed to a merger core 440. Each merger core 440 receives activity from r*n/i input blocks 445.

Figure 22:
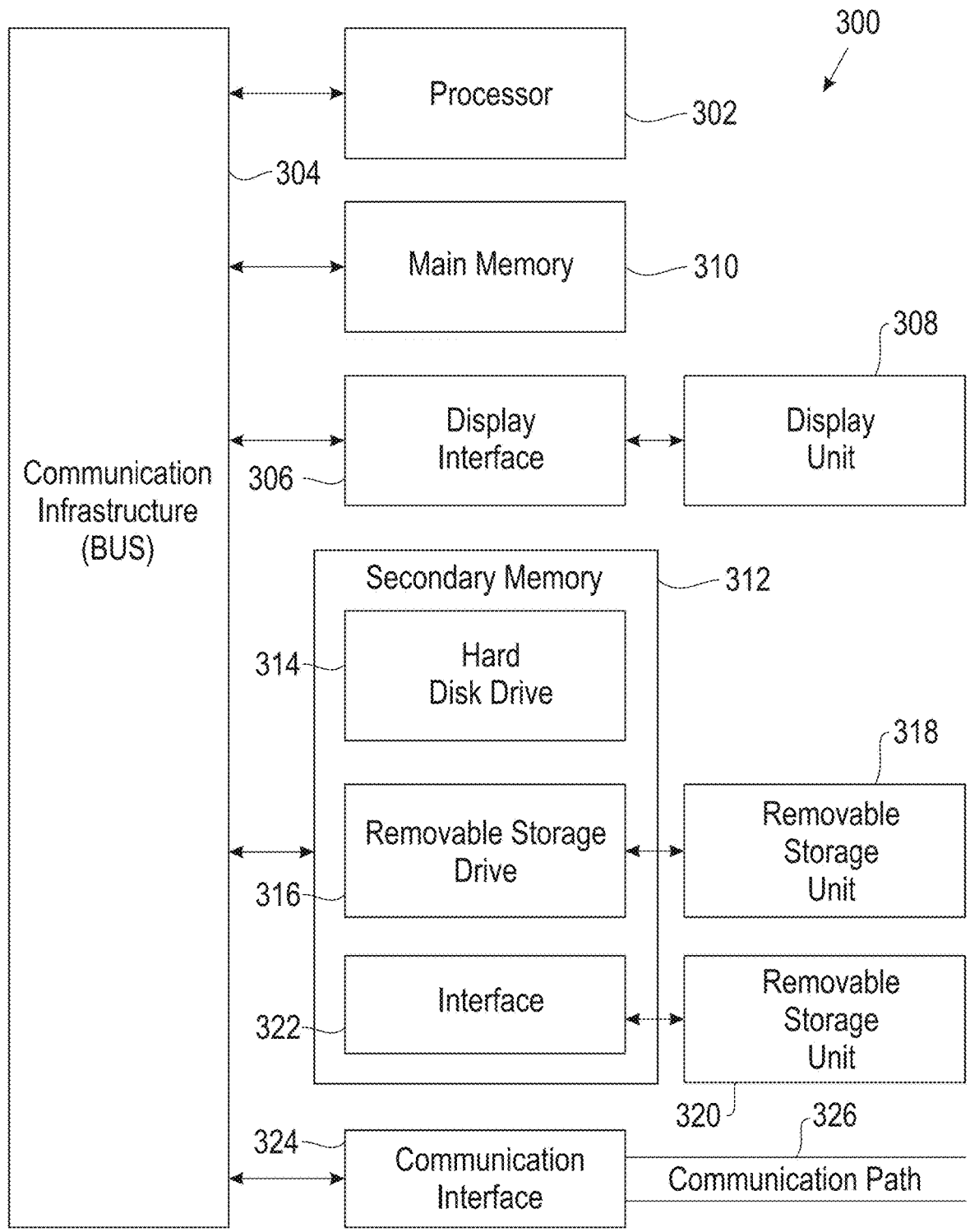
FIG. 22 illustrates a high level block diagram showing an information processing system useful for implementing one embodiment of the present invention.

FIG. 22 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   at least one set of functional neural core circuits, wherein each functional neural core circuit comprises a pair of core modules logically overlaid on one another, and each core module comprises electronic neurons, electronic axons, and electronic synapses interconnecting the electronic neurons with the electronic axons; and
   at least one set of connectivity neural core circuits interconnecting at least one electronic neuron of the at least one set of functional neural core circuits with at least one other electronic neuron of the at least one set of functional neural core circuits, wherein each connectivity neural core circuit comprises a bi-directional crossbar switch;
   wherein the at least one set of connectivity neural core circuits provides a fanout based on a number of connectivity neural core circuits included in the at least one set of connectivity neural core circuits; and
   wherein the at least one set of connectivity neural core circuits provides structural plasticity, enabling each functional neural core circuit of the at least one set of functional neural core circuits to communicate with any other functional neural core circuit of the at least one set of functional neural core circuits.

2. The system of claim 1, wherein the system is self-configuring and self-adapting.

3. The system of claim 1, wherein:
   each electronic synapse has configurable operational parameters; and
   each electronic neuron has configurable operational parameters.

4. The system of claim 3, wherein each electronic neuron is configured to receive as input one or more incoming spikes.

5. The system of claim 4, wherein:
   each electronic synapse has a configurable level of conduction; and
   each electronic neuron is configured to generate an outgoing spike each time the electronic neuron receives an incoming spike from another electronic neuron via a conducting electronic synapse.

6. The system of claim 1, wherein the at least one set of functional neural core circuits represents one or more neural functions.

7. A method comprising:
- interconnecting at least one electronic neuron of at least one set of functional neural core circuits with at least one other electronic neuron of the at least one set of functional neural core circuits via at least one set of functional neural core circuits;
- wherein each functional neural core circuit comprises a pair of core modules logically overlaid on one another, and each core module comprises electronic neurons, electronic axons, and electronic synapses interconnecting the electronic neurons with the electronic axons;
- wherein each connectivity neural core circuit comprises a bi-directional crossbar switch;
- wherein the at least one set of connectivity neural core circuits provides a fanout based on a number of connectivity neural core circuits included in the at least one set of connectivity neural core circuits; and
- wherein the at least one set of connectivity neural core circuits provides structural plasticity, enabling each functional neural core circuit of the at least one set of functional neural core circuits to communicate with any other functional neural core circuit of the at least one set of functional neural core circuits.

8. The method of claim 7, wherein:
- each electronic synapse has configurable operational parameters; and
- each electronic neuron has configurable operational parameters.

9. The method of claim 8, wherein each electronic neuron is configured to receive as input one or more incoming spikes.

10. The method of claim 9, wherein:
- each electronic synapse has a configurable level of conduction; and
- each electronic neuron is configured to generate an outgoing spike each time the electronic neuron receives an incoming spike from another electronic neuron via a conducting electronic synapse.

11. The method of claim 7, wherein the at least one set of functional neural core circuits represents one or more neural functions.

12. A computer program product comprising a computer-readable hardware storage device having program code embodied therewith, the program code being executable by a computer to implement a method comprising:
- interconnecting at least one electronic neuron of at least one set of functional neural core circuits with at least one other electronic neuron of the at least one set of functional neural core circuits via at least one set of functional neural core circuits;
- wherein each functional neural core circuit comprises a pair of core modules logically overlaid on one another, and each core module comprises electronic neurons, electronic axons, and electronic synapses interconnecting the electronic neurons with the electronic axons;
- wherein each connectivity neural core circuit comprises a bi-directional crossbar switch;
- wherein the at least one set of connectivity neural core circuits provides a fanout based on a number of connectivity neural core circuits included in the at least one set of connectivity neural core circuits; and
- wherein the at least one set of connectivity neural core circuits provides structural plasticity, enabling each functional neural core circuit of the at least one set of functional neural core circuits to communicate with any other functional neural core circuit of the at least one set of functional neural core circuits.

13. The computer program product of claim 12, wherein:
- each electronic synapse has configurable operational parameters; and
- each electronic neuron has configurable operational parameters.

14. The computer program product of claim 13, wherein each electronic neuron is configured to receive as input one or more incoming spikes.

15. The computer program product of claim 14, wherein:
- each electronic synapse has a configurable level of conduction; and
- each electronic neuron is configured to generate an outgoing spike each time the electronic neuron receives an incoming spike from another electronic neuron via a conducting electronic synapse.

16. The computer program product of claim 12, wherein the at least one set of functional neural core circuits represents one or more neural functions.

* * * * *